(12) United States Patent
Cao et al.

(10) Patent No.: US 12,536,207 B2
(45) Date of Patent: Jan. 27, 2026

(54) METHOD AND APPARATUS FOR RETRIEVING THREE-DIMENSIONAL (3D) MAP

(71) Applicant: HUAWEI TECHNOLOGIES CO., LTD., Shenzhen (CN)

(72) Inventors: Xiaoran Cao, Hangzhou (CN); Pei Wang, Beijing (CN); Kangying Cai, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 152 days.

(21) Appl. No.: 18/526,801

(22) Filed: Dec. 1, 2023

(65) Prior Publication Data

US 2024/0095265 A1    Mar. 21, 2024

Related U.S. Application Data

(63) Continuation of application No. PCT/CN2021/105625, filed on Jul. 9, 2021.

(30) Foreign Application Priority Data

Jun. 4, 2021    (WO) ................ PCT/CN2021/098482
Jun. 4, 2021    (WO) ................ PCT/CN2021/098483

(51) Int. Cl.
     *G06F 16/29*      (2019.01)
     *G06F 16/487*      (2019.01)
     (Continued)

(52) U.S. Cl.
     CPC ............ *G06F 16/29* (2019.01); *G06F 16/487* (2019.01); *G06T 9/00* (2013.01); *G06T 17/00* (2013.01); *G06T 17/05* (2013.01)

(58) Field of Classification Search
None
See application file for complete search history.

(56) References Cited

U.S. PATENT DOCUMENTS 6,326,965 B1 * 12/2001 Castelli .................. G06F 16/29
                                                     707/999.104
2020/0126256 A1    4/2020    Sinha et al.

FOREIGN PATENT DOCUMENTS

CN      104794219 A    7/2015
EP      4343574 A1    3/2024
(Continued)

OTHER PUBLICATIONS

Dubé et al., "SegMap: Segment-based mapping and localization using data-driven descriptors", Mar. 2020, SAGE Publications, vol. 39, No. 2-3, pp. 339-355 (Year: 2020).*

(Continued)

*Primary Examiner* — Kent W Chang
*Assistant Examiner* — Jonathan M Cofino
(74) *Attorney, Agent, or Firm* — Leydig, Voit & Mayer, Ltd.

(57) ABSTRACT

A method and an apparatus are disclosed for retrieving a 3D map by obtaining binary data of a plurality of 3D map descriptors, obtaining binary data of a retrieval descriptor, and performing retrieval in the binary data of the plurality of 3D map descriptors based on binary data of the retrieval descriptor, to obtain at least one target 3D map descriptor. The plurality of 3D map descriptors correspond to at least one 3D map point of the 3D map. The retrieval descriptor is a feature that corresponds to a real environment and that is extracted from visual information collected by a sensor of an electronic device. A length of binary data of each of the plurality of 3D map descriptors is different from a length of the binary data of the retrieval descriptor.

20 Claims, 9 Drawing Sheets

(51) Int. Cl.
*G06T 9/00* (2006.01)
*G06T 17/00* (2006.01)
*G06T 17/05* (2011.01)

(56) References Cited

FOREIGN PATENT DOCUMENTS

| | | |
|---|---|---|
| JP | 2010118019 A | 5/2010 |
| JP | 2016528476 A | 9/2016 |
| JP | 6099833 B1 | 3/2017 |

OTHER PUBLICATIONS

Strecha et al., "LDAHash: Improved Matching with Smaller Descriptors," IEEE Transactions on Pattern Analysis and Machine Intelligence, vol. 34, No. 1, Total 13 pages (Jan. 2012).

Tran et al., "On-Device Scalable Image-Based Localization via Prioritized Cascade Search and Fast One-Many Ransac," IEEE Transactions on Image Processing, vol. 28, No. 4, Total 16 pages (Apr. 2019).

Dube et al., "SegMap: Segment-based mapping and localization using data-driven descriptors," The International Journal of Robotics Research, Total 17 pages (Sep. 2019).

\* cited by examiner

METHOD AND APPARATUS FOR RETRIEVING THREE-DIMENSIONAL (3D) MAP

CROSS-REFERENCE TO RELATED APPLICATIONS

This application is a continuation of International Application No. PCT/CN2021/105625, filed on Jul. 9, 2021, which claims priority to International Patent Application No. PCT/CN2021/098482, filed on Jun. 4, 2021 and International Patent Application No. PCT/CN2021/098483, filed on Jun. 4, 2021. The disclosures of the aforementioned applications are hereby incorporated by reference in their entireties.

TECHNICAL FIELD

This application relates to three-dimensional (3D) map technologies, and in particular, to a method and an apparatus for retrieving a 3D map.

BACKGROUND

Virtual reality (VR), augmented reality (AR), and mixed reality (MR) technologies are emerging multimedia virtual scenario technologies in recent years. Such technologies can be used to create virtual reality and overlay it with a real world to produce a new visual environment and interactive experience. In such an application, an electronic device needs to determine pose information of the electronic device in a current environment, to accurately implement fusion between a virtual object and a real scene.

In addition, in applications such as autonomous driving, autonomous navigation, uncrewed aerial vehicle automatic inspection, and industrial robots, a carrying device such as a vehicle, an uncrewed aerial vehicle, or a robot needs to determine a pose of an electronic device carried by the carrying device, to determine a pose of the carrying device in a current environment, so as to perform accurate route planning, navigation, detection, and control.

In the foregoing applications, for a problem that the pose of the electronic device in the current environment needs to be determined, a typical solution is as follows: The electronic device receives, from a server or another device, a three-dimensional (3-dimensional, 3D) map of an environment in which the electronic device is located, collects visual information in the environment by using a local sensor, and performs retrieval in a downloaded 3D map based on the collected visual information, to determine the current pose of the electronic device.

However, an original 3D map usually includes a large data volume, and a calculation amount for retrieval is usually extremely large. This requires a large quantity of computing resources, and takes a long time, thereby affecting user experience.

SUMMARY

Embodiments of this application provide a method and an apparatus for retrieving a 3D map, to improve retrieval performance by using binary data retrieval.

According to a first aspect, an embodiment of this application provides a method for retrieving a 3D map. The method may include: obtaining binary data of a plurality of 3D map descriptors, where the plurality of 3D map descriptors correspond to at least one 3D map point of a 3D map; obtaining binary data of a retrieval descriptor, where the retrieval descriptor is a feature that corresponds to a real environment and that is extracted from visual information collected by a sensor of an electronic device; and performing retrieval in the binary data of the plurality of 3D map descriptors based on the binary data of the retrieval descriptor, to obtain at least one target 3D map descriptor, where a length of binary data of each of the plurality of 3D map descriptors is different from a length of the binary data of the retrieval descriptor.

It can be learned that, in this embodiment, retrieval performance can be improved by using asymmetric binary data retrieval. The length of binary data of the retrieval descriptor used for retrieval is different from the length of the binary data of each of the plurality of 3D map descriptors, so that a descriptor with a smaller length (the 3D map descriptor or the retrieval descriptor) may have a higher compression ratio, thereby saving storage space and/or transmission resource overheads; or a descriptor with a larger length (the retrieval descriptor or the 3D map descriptor) may provide more information for retrieval, thereby improving retrieval accuracy.

For example, a length of binary data of a 3D map descriptor is greater than a length of binary data of a retrieval descriptor. The binary data of the 3D map descriptor has more bits than the binary data of the retrieval descriptor. In this way, more original information of the 3D map descriptor may be retained, thereby improving accuracy of at least one target 3D map descriptor obtained through retrieval. The binary data of the retrieval descriptor has fewer bits than the binary data of the 3D map descriptor. In this way, bit overheads of the retrieval descriptor may be reduced, so that the retrieval descriptor may have a higher compression ratio, thereby saving storage space and/or transmission resource overheads.

For another example, a length of binary data of a 3D map descriptor is less than a length of binary data of a retrieval descriptor. The binary data of the 3D map descriptor has fewer bits than the binary data of the retrieval descriptor. In this way, storage space and/or transmission resource overheads of the 3D map may be saved. The binary data of the retrieval descriptor has more bits than the binary data of the 3D map descriptor. In this way, more original information of the retrieval descriptor may be retained, thereby improving accuracy of at least one target 3D map descriptor obtained through retrieval.

In a possible design, a 3D map point corresponding to the at least one target 3D map descriptor matches a map point corresponding to the retrieval descriptor, and the method may further include: performing positioning based on the 3D map point corresponding to the at least one target 3D map descriptor, to obtain pose information of the electronic device.

In this implementation, retrieval performance may be improved by using binary data retrieval. When the 3D map point corresponding to the at least one target 3D map descriptor obtained through retrieval matches the map point corresponding to the retrieval descriptor, positioning may be performed based on the 3D map point corresponding to the at least one target 3D map descriptor. This helps improve positioning performance.

In a possible design, the performing retrieval in the binary data of the plurality of 3D map descriptors based on the binary data of the retrieval descriptor, to obtain at least one target 3D map descriptor includes: determining a first distance (for example, a distance obtained based on a plurality of Hamming distances, or a distance obtained based on a plurality of customized distances) between each of the plurality of 3D map descriptors and the retrieval descriptor based on the binary data of the retrieval descriptor and the binary data of the plurality of 3D map descriptors. A first distance between any one of the plurality of 3D map descriptors and the retrieval descriptor is determined based on a plurality of second distances (for example, Hamming distances, or customized distances), and any one of the plurality of second distances is determined based on partial data of the binary data of the retrieval descriptor and partial data of binary data of a corresponding 3D map descriptor, or is determined based on partial data of the binary data of the retrieval descriptor and all data of binary data of a corresponding 3D map descriptor, or is determined based on partial data of binary data of the 3D map descriptor and partial data of the binary data of the retrieval descriptor, or is determined based on partial data of binary data of the 3D map descriptor and all data of the binary data of the retrieval descriptor; and select at least one 3D map descriptor from the plurality of 3D map descriptors as the at least one target 3D map descriptor based on the first distance between each of the plurality of 3D map descriptors and the retrieval descriptor.

It should be understood that "first", "second", and "third" in the first distance, the second distance, the third distance, and the like are not in a sequential order, and are merely used for distinguishing between each other.

A manner of calculating the customized distance may be: obtaining an absolute value of a difference value between corresponding bits of two pieces of binary data, and adding up absolute values of all differences.

For example, when a length of binary data of a 3D map descriptor is greater than a length of binary data of a retrieval descriptor, a first distance between the 3D map descriptor and the retrieval descriptor may be determined based on a plurality of second distances, and any one of the plurality of second distances is determined based on partial data of the binary data of the 3D map descriptor and partial data of the binary data of the retrieval descriptor, or is determined based on partial data of the binary data of the 3D map descriptor and all data of the binary data of the retrieval descriptor.

A length of partial data, used to determine one second distance, of the binary data of the 3D map descriptor may be the same as a length of partial data of the binary data of the retrieval descriptor. The second distance may be a Hamming distance, a customized distance, or the like. Alternatively, a length of partial data, used to determine one second distance, of the binary data of the 3D map descriptor may be different from a length of partial data of the binary data of the retrieval descriptor. The second distance may be a known distance, for example, may be obtained in a manner such as looking up a table.

According to a same principle, a length of partial data, used to determine one second distance, of the binary data of the 3D map descriptor may be the same as or different from a length of all data of the binary data of the retrieval descriptor.

For example, the first distance between the 3D map descriptor and the retrieval descriptor may be determined based on two second distances (a second distance 1 and a second distance 2). The second distance 1 is determined based on first partial data of the binary data of the 3D map descriptor and all data of the binary data of the retrieval descriptor, and the second distance 2 is determined based on second partial data of the binary data of the 3D map descriptor and all data of the binary data of the retrieval descriptor. The length of the binary data of the 3D map descriptor may be less than a sum of lengths of the first partial data and the second partial data, that is, there is an overlap between the first partial data and the second partial data. The length of the binary data of the 3D map descriptor may be greater than or equal to a sum of lengths of the first partial data and the second partial data, that is, there is no overlap between the first partial data and the second partial data.

For example, when a length of binary data of a 3D map descriptor is less than a length of binary data of a retrieval descriptor, a first distance between the 3D map descriptor and the retrieval descriptor may be determined based on a plurality of second distances, and any one of the plurality of second distances is determined based on partial data of the binary data of the retrieval descriptor and partial data of the binary data of the 3D map descriptor, or is determined based on partial data of the binary data of the retrieval descriptor and all data of the binary data of the 3D map descriptor.

A length of partial data of the binary data, used to determine one second distance, of the retrieval descriptor may be the same as or different from a length of partial data of the binary data of the 3D map descriptor.

A length of partial data of the binary data, used to determine one second distance, of the retrieval descriptor may be the same as or different from a length of all data of the binary data of the 3D map descriptor.

For example, the first distance between the 3D map descriptor and the retrieval descriptor may be determined based on two second distances (a second distance 1 and a second distance 2). The second distance 1 is determined based on first partial data of the binary data of the retrieval descriptor and all data of the binary data of the 3D map descriptor, and the second distance 2 is determined based on second partial data of the binary data of the retrieval descriptor and all data of the binary data of the 3D map descriptor. The length of the binary data of the retrieval descriptor may be less than a sum of lengths of the first partial data and the second partial data, that is, there may be an overlap between the first partial data and the second partial data. The length of the binary data of the retrieval descriptor may be greater than or equal to a sum of lengths of the first partial data and the second partial data, that is, there is no overlap between the first partial data and the second partial data.

In this implementation, the first distance between the binary data of the 3D map descriptor and the binary data of the retrieval descriptor that are asymmetric is determined by using the plurality of second distances, and then retrieval is performed based on the first distance, so that a descriptor with a smaller length (the 3D map descriptor or the retrieval descriptor) may have a higher compression ratio, thereby saving storage space and/or transmission resource overheads, and a descriptor with a larger length (the retrieval descriptor or the 3D map descriptor) may provide more information for retrieval, thereby improving retrieval accuracy.

In a possible design, a distortion of a first distance between any one of the plurality of 3D map descriptors and the retrieval descriptor is less than a distortion threshold. The distortion of the first distance indicates a degree of a difference between the first distance and a corresponding original distance, and the original distance is a distance (for example, a Euclidean distance or a Manhattan distance) between the 3D map descriptor and the retrieval descriptor. For example, the original distance may be understood as a Euclidean distance that is between the 3D map descriptor and the retrieval descriptor and that is directly calculated in a Euclidean distance calculation manner.

In this embodiment, the distortion of the first distance between the binary data of the 3D map descriptor and the binary data of the retrieval descriptor determined by using the plurality of second distances is less than the distortion threshold. Because the first distance between the binary data of the 3D map descriptor used for retrieval and the binary data of the retrieval descriptor is less than the distortion threshold, accuracy of a retrieval result can be ensured. A smaller distortion of the first distance used for retrieval better helps improve retrieval accuracy.

In different design manners, the distortion threshold may be a preset threshold, or may be a distortion of a third distance between a corresponding 3D map descriptor and a retrieval descriptor. The third distance is a distance between partial data of the binary data of the retrieval descriptor and all data of the binary data of the 3D map descriptor, or is a distance between all data of the binary data of the retrieval descriptor and partial data of the binary data of the 3D map descriptor.

For example, when a length of binary data of a 3D map descriptor is greater than a length of binary data of a retrieval descriptor, a third distance between the 3D map descriptor and the retrieval descriptor is a distance between all data of the binary data of the retrieval descriptor and partial data of the binary data of the 3D map descriptor. In other words, when a length of binary data of a 3D map descriptor is greater than a length of binary data of a retrieval descriptor, a distortion of a first distance between the 3D map descriptor and the retrieval descriptor is less than a distortion of a distance between partial data of the binary data of the 3D map descriptor and all data of the binary data of the retrieval descriptor. A length of partial data of the binary data of the 3D map descriptor may be the same as a length of all data of the binary data of the 3D map descriptor. When a length of binary data of a 3D map descriptor is less than a length of binary data of a retrieval descriptor, a third distance between the 3D map descriptor and the retrieval descriptor is a distance between partial data of the binary data of the retrieval descriptor and all data of the binary data of the 3D map descriptor. In other words, when a length of binary data of a 3D map descriptor is less than a length of binary data of a retrieval descriptor, a distortion of a first distance between the 3D map descriptor and the retrieval descriptor is less than a distortion of a distance between all data of the binary data of the 3D map descriptor and partial data of the binary data of the 3D map descriptor. A length of all data of the binary data of the 3D map descriptor may be the same as a length of partial data of the binary data of the 3D map descriptor.

In this implementation, the distortion of the first distance between the binary data of the 3D map descriptor and the binary data of the retrieval descriptor that are asymmetric is less than the distortion of the distance between partial data of the binary data of the 3D map descriptor and all data of the binary data of the retrieval descriptor that are symmetric, or is less than the distortion of the distance between all data of the binary data of the 3D map descriptor and partial data of the binary data of the retrieval descriptor that are symmetric. A smaller distortion of the first distance used for retrieval better helps improve retrieval accuracy.

In a possible design, a length of partial data of the binary data of the retrieval descriptor is the same as a length of partial data or all data of binary data of each of the plurality of 3D map descriptors, or a length of partial data of binary data of each of the plurality of 3D map descriptors is the same as a length of partial data or all data of the binary data of the retrieval descriptor.

In a possible design, the first distance between any one of the plurality of 3D map descriptors and the retrieval descriptor is determined based on the plurality of second distances and weighting coefficients respectively corresponding to the plurality of second distances.

In this implementation, different second distances are weighted by using weighting coefficients, to reduce the distortion of the first distance, thereby helping improve retrieval precision.

The weighting coefficients respectively corresponding to the plurality of second distances may be respective importance degrees of the plurality of second distances, and the importance degree indicates a degree of impact of a corresponding second distance on the distortion of the first distance.

The importance degrees respectively corresponding to the plurality of second distances are determined based on at least one of the following: a location of partial data, corresponding to the second distance, of the binary data of the retrieval descriptor, or a location of partial data, corresponding to the second distance, of the binary data of the 3D map descriptor. The location herein may be a location of partial data in all data of corresponding binary data, for example, a start location or an end location of partial data in all data of corresponding binary data.

For example, the first distance between the 3D map descriptor and the retrieval descriptor may be determined based on two second distances (a second distance 1 and a second distance 2). The second distance 1 is determined based on first partial data of the binary data of the retrieval descriptor and all data of the binary data of the 3D map descriptor, and the second distance 2 is determined based on second partial data of the binary data of the retrieval descriptor and all data of the binary data of the 3D map descriptor. A start location of the first partial data is higher than a start location of the second partial data, and an importance degree corresponding to the second distance 1 is greater than an importance degree corresponding to the second distance 2.

In a possible design, when the length of the binary data of each of the plurality of 3D map descriptors is less than the length of the binary data of the retrieval descriptor, the binary data of the retrieval descriptor includes a plurality of first binary substrings of the retrieval descriptor, the binary data of each of the plurality of 3D map descriptors includes at least one second binary substring of each of the plurality of 3D map descriptors, a length of each of the plurality of first binary substrings is the same as a length of each of the at least one second binary substring, and the plurality of second distances include a distance between each of the plurality of first binary substrings and the at least one second binary substring.

When the length of the binary data of each of the plurality of 3D map descriptors is greater than the length of the binary data of the retrieval descriptor, the binary data of the retrieval descriptor includes at least one first binary substring of the retrieval descriptor, the binary data of each of the plurality of 3D map descriptors includes a plurality of second binary substrings of each of the plurality of 3D map descriptors, a length of each of the at least one first binary substring is the same as a length of each of the plurality of second binary substrings, and the plurality of second distances include a distance between each of the plurality of second binary substrings and the at least one first binary substring.

In this implementation, a plurality of second distances between symmetric binary substrings are calculated, a first distance between asymmetric binary data is calculated based on the plurality of second distances, and retrieval is performed based on the first distance. The first distance has a reduced distortion. Therefore, this helps improve retrieval precision.

In a possible design, any one of the plurality of 3D map descriptors includes an area descriptor or a 3D map point descriptor.

In a possible design, the obtaining binary data of a plurality of 3D map descriptors may include: obtaining compressed data of the 3D map, where the compressed data of the 3D map includes the binary data of the plurality of 3D map descriptors. An execution body (which may be an electronic device, or may be a server (for example, a cloud server)) configured to perform the retrieval method in the first aspect may obtain the compressed data of the 3D map from a storage module, and obtain the binary data of the plurality of 3D map descriptors from the compressed data.

In another possible design, the obtaining binary data of a plurality of 3D map descriptors may include: obtaining compressed data of the 3D map, and decompressing the compressed data of the 3D map to obtain the binary data of the plurality of 3D map descriptors. An execution body (which may be an electronic device, or may be a server (for example, a cloud server)) configured to perform the retrieval method in the first aspect may obtain the compressed data of the 3D map from a storage module, and decompress the compressed data of the 3D map to obtain the binary data of the plurality of 3D map descriptors.

In still another possible design, the obtaining binary data of a plurality of 3D map descriptors may include: receiving a bitstream of the 3D map, and decompressing the bitstream of the 3D map to obtain the binary data of the plurality of 3D map descriptors. An execution body (which may be an electronic device, or may be a server (for example, a cloud server)) configured to perform the retrieval method in the first aspect may receive the bitstream of the 3D map from a transmission module, and decompress the bitstream of the 3D map to obtain the binary data of the plurality of 3D map descriptors.

In a possible design, the obtaining binary data of a retrieval descriptor includes: receiving the retrieval descriptor, and performing binarization on the retrieval descriptor to obtain the binary data of the retrieval descriptor. An execution body (which may be an electronic device, or may be a server (for example, a cloud server)) configured to perform the retrieval method in the first aspect may receive the retrieval descriptor sent by another device. For example, an execution body configured to perform the retrieval method in the first aspect receives the retrieval descriptor collected and extracted by another electronic device.

In another possible design, the obtaining binary data of a retrieval descriptor includes: receiving visual information, extracting the retrieval descriptor from the visual information, and performing binarization on the retrieval descriptor to obtain the binary data of the retrieval descriptor. An execution body (which may be an electronic device or a server) configured to perform the retrieval method in the first aspect may receive the visual information sent by another device, and extract the retrieval descriptor from the visual information.

In still another possible design, the obtaining binary data of a retrieval descriptor includes: in response to a visual information collection operation entered by a user, triggering the sensor to perform visual information collection on the real environment to obtain the visual information, extracting the retrieval descriptor from the visual information, and performing binarization on the retrieval descriptor to obtain the binary data of the retrieval descriptor. An execution body (which may be an electronic device or a server) configured to perform the retrieval method in the first aspect may collect the visual information, and extract the retrieval descriptor from the visual information.

According to a second aspect, this application provides an apparatus for retrieving a 3D map. The apparatus may be an electronic device or a server, for example, a chip or a system-on-chip in the electronic device or the server, and may be, for example, a functional module that is in the electronic device or the server and that is configured to implement the first aspect or any possible implementation of the first aspect. For example, the apparatus for retrieving a 3D map the includes: a first obtaining module, configured to obtain binary data of a plurality of 3D map descriptors, where the plurality of 3D map descriptors correspond to at least one 3D map point of a 3D map; a second obtaining module, configured to obtain binary data of a retrieval descriptor, where the retrieval descriptor is a feature that corresponds to a real environment and that is extracted from visual information collected by a sensor of an electronic device; and a retrieval module, configured to perform retrieval in the binary data of the plurality of 3D map descriptors based on the binary data of the retrieval descriptor, to obtain at least one target 3D map descriptor, where a length of binary data of each of the plurality of 3D map descriptors is different from a length of the binary data of the retrieval descriptor.

In a possible design, a 3D map point corresponding to the at least one target 3D map descriptor matches a map point corresponding to the retrieval descriptor, and the apparatus may further include a pose determining module. The pose determining module is configured to perform positioning based on the 3D map point corresponding to the at least one target 3D map descriptor, to obtain pose information of the electronic device.

In a possible design, the retrieval module is configured to: determine a first distance between each of the plurality of 3D map descriptors and the retrieval descriptor based on the binary data of the retrieval descriptor and the binary data of the plurality of 3D map descriptors, where a first distance between any one of the plurality of 3D map descriptors and the retrieval descriptor is determined based on a plurality of second distances; and any one of the plurality of second distances is determined based on partial data of binary data of a corresponding retrieval descriptor and partial data of binary data of the 3D map descriptor, or is determined based on partial data of binary data of a corresponding retrieval descriptor and all data of binary data of the 3D map descriptor, or is determined based on partial data of binary data of a corresponding 3D map descriptor and partial data of the binary data of the retrieval descriptor, or is determined based on partial data of the binary data of a corresponding 3D map descriptor and all data of the binary data of the retrieval descriptor; and select at least one 3D map descriptor from the plurality of 3D map descriptors as the at least one target 3D map descriptor based on the first distance between each of the plurality of 3D map descriptors and the retrieval descriptor.

In a possible design, a distortion of a first distance between any one of the plurality of 3D map descriptors and the retrieval descriptor is less than a distortion threshold. The distortion of the first distance indicates a degree of a difference between the first distance and a corresponding original distance, and the original distance is a distance between the 3D map descriptor and the retrieval descriptor.

In a possible design, a length of partial data of the binary data of the retrieval descriptor is the same as a length of partial data of the binary data of each of the plurality of 3D map descriptors; or a length of partial data of the binary data of the retrieval descriptor is the same as a length of all data of the binary data of each of the plurality of 3D map descriptors; or a length of partial data of the binary data of each of the plurality of 3D map descriptors is the same as a length of partial data of the binary data of the retrieval descriptor; or a length of partial data of the binary data of each of the plurality of 3D map descriptors is the same as a length of all data of the binary data of the retrieval descriptor.

In a possible design, the first distance between any one of the plurality of 3D map descriptors and the retrieval descriptor is determined based on the plurality of second distances and weighting coefficients respectively corresponding to the plurality of second distances.

In a possible design, when the length of the binary data of each of the plurality of 3D map descriptors is less than the length of the binary data of the retrieval descriptor, the binary data of the retrieval descriptor includes a plurality of first binary substrings of the retrieval descriptor, the binary data of each of the plurality of 3D map descriptors includes at least one second binary substring of each of the plurality of 3D map descriptors, a length of each of the plurality of first binary substrings is the same as a length of each of the at least one second binary substring, and the plurality of second distances include a distance between each of the plurality of first binary substrings and the at least one second binary substring.

When the length of the binary data of each of the plurality of 3D map descriptors is greater than the length of the binary data of the retrieval descriptor, the binary data of the retrieval descriptor includes at least one first binary substring of the retrieval descriptor, the binary data of each of the plurality of 3D map descriptors includes a plurality of second binary substrings of each of the plurality of 3D map descriptors, a length of each of the at least one first binary substring is the same as a length of each of the plurality of second binary substrings, and the plurality of second distances include a distance between each of the plurality of second binary substrings and the at least one first binary substring.

In a possible design, any one of the plurality of 3D map descriptors includes an area descriptor or a 3D map point descriptor.

In a possible design, the first obtaining module is configured to obtain compressed data of the 3D map, where the compressed data of the 3D map includes the binary data of the plurality of 3D map descriptors; or in another possible design, the first obtaining module is configured to obtain compressed data of the 3D map, and decompress the compressed data of the 3D map to obtain the binary data of the plurality of 3D map descriptors; or in still another possible design, the first obtaining module is configured to receive a bitstream of the 3D map, and decompress the bitstream of the 3D map to obtain the binary data of the plurality of 3D map descriptors.

In a possible design, the second obtaining module is configured to receive the retrieval descriptor, and perform binarization on the retrieval descriptor to obtain the binary data of the retrieval descriptor; or in another possible design, the second obtaining module is configured to receive the visual information, extract the retrieval descriptor from the visual information, and perform binarization on the retrieval descriptor to obtain the binary data of the retrieval descriptor; or in still another possible design, the second obtaining module is configured to: in response to a visual information collection operation entered by the user, trigger the sensor to perform visual information collection on the real environment to obtain the visual information, extract the retrieval descriptor from the visual information, and perform binarization on the retrieval descriptor to obtain the binary data of the retrieval descriptor.

According to a third aspect, an embodiment of this application provides an apparatus for retrieving a 3D map, including: one or more processors; and a memory, configured to store one or more programs. When the one or more programs are executed by the one or more processors, the one or more processors are enabled to implement the method according to any one of the first aspect or the possible designs of the first aspect.

According to a fourth aspect, an embodiment of this application provides a computer-readable storage medium, including a computer program. When the computer program is executed on a computer, the computer is enabled to perform the method according to any one of the first aspect or the possible designs of the first aspect.

According to a fifth aspect, this application provides a computer program or a computer program product. When the computer program or the computer program product is executed on a computer, the computer is enabled to implement the method according to any one of the first aspect or the possible implementations of the first aspect.

It should be understood that the technical solutions in the second aspect to the fifth aspect of this application are consistent with the technical solution in the first aspect of this application. Beneficial effects achieved in the aspects and the corresponding feasible implementations are similar thereto, and details are not described again.

DESCRIPTION OF EMBODIMENTS

Figure 1:
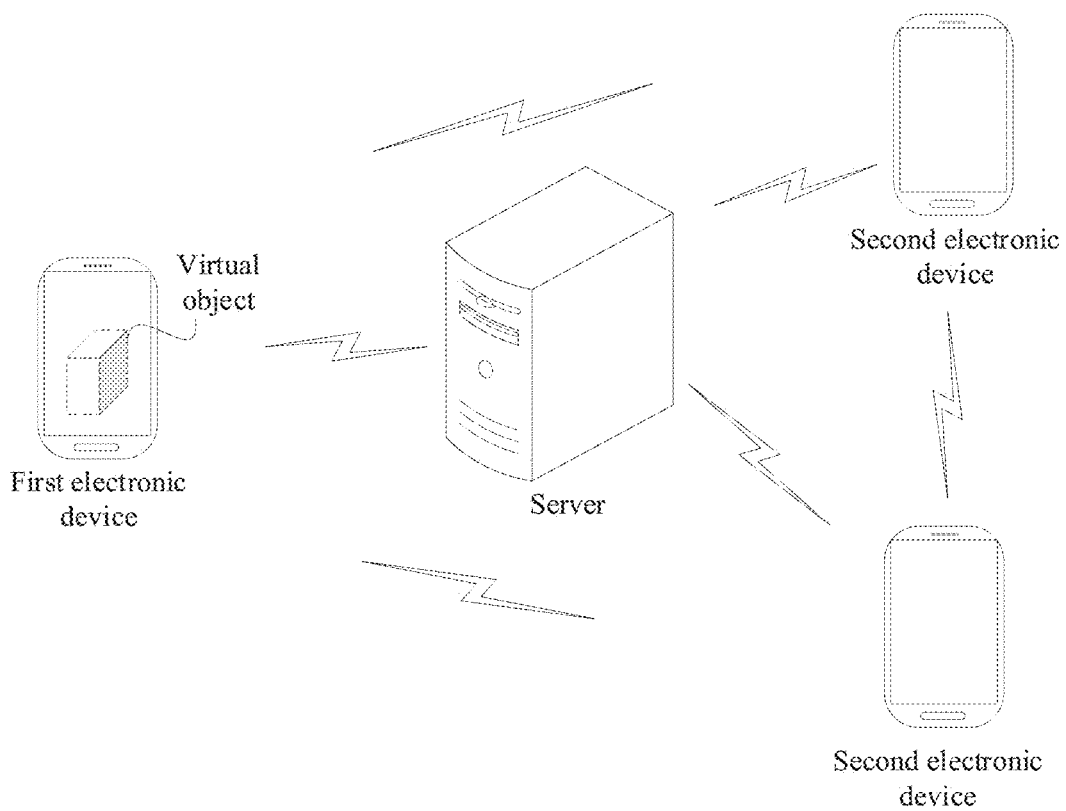
FIG. 1 is a schematic diagram of an application architecture according to an embodiment of this application.

The following describes embodiments of this application with reference to the accompanying drawings in embodiments of this application. Terms used in embodiments of this application are merely used to explain exemplary embodiments of this application, but are not intended to limit this application.

In embodiments of the specification, claims, and the accompanying drawings of this application, the terms "first", "second", and the like are merely intended for distinguishing and description, and shall not be understood as an indication or implication of relative importance or an indication or implication of an order. In addition, the terms "include", "have", and any variant thereof are intended to cover non-exclusive inclusion, for example, inclusion of a series of steps or units. A method, a system, a product, or a device is not necessarily limited to clearly listed steps or units, but may include other steps or units that are not clearly listed and that are inherent to the process, the method, the product, or the device.

It should be understood that, in this application, "at least one (item)" is one or more, and "a plurality of" is two or more. The term "and/or" describes an association relationship of associated objects, and indicates that three relationships may exist. For example, "A and/or B" may indicate the following three cases: Only A exists, only B exists, and both A and B exist. A and B may be singular or plural. The character "/" usually indicates an "or" relationship between associated objects. "At least one of the following items" or a similar expression thereto indicates any combination of the items, including one of the items or any combination of a plurality of the items. For example, at least one of a, b, or c may indicate a, b, c, a and b, a and c, b and c, or a, b, and c, where a, b, and c may be singular or plural.

In embodiments of this application, the term such as "example" or "for example" is used to represent giving an example, an illustration, or a description. Any embodiment or design described by "example" or "for example" in embodiments of this application shall not be construed as being more preferred or advantageous than another embodiment or design. To be precise, the term such as "example" or "for example" is intended to present a relative concept in a specific manner.

The terms "a", "said", and "the" in singular forms used in embodiments and the appended claims of this application are also intended to include plural forms, unless otherwise specified in the context clearly. It should be further understood that, the term "and/or" used herein indicates and includes any or all possible combinations of one or more associated listed items. As used herein, the meaning of "a", "some", and "the" in singular forms also includes plural forms, unless otherwise expressly indicated in the context. It should be further understood that the terms "include", "have", "comprise", and/or "include" are used in this specification to specify the existence of the stated features, integers, steps, operations, elements, and/or components, but do not exclude the existence or addition of one or more other features, integers, steps, operations, elements, components, and/or groups thereof.

It should be noted that the terms used in embodiments of this application are merely for the purpose of illustrating exemplary embodiments, and are not intended to limit this application.

FIG. 1 is a schematic diagram of an application architecture according to an embodiment of this application. As shown in FIG. 1, the application architecture includes a plurality of electronic devices and a server. The plurality of electronic devices may include a first electronic device and one or more second electronic devices (two second electronic devices are used as an example in FIG. 1). The one or more second electronic devices are several electronic devices other than the first electronic device. Communication may be performed between the plurality of electronic devices and the server and between the plurality of electronic devices. For example, any device in the application architecture may communicate with another device in a manner such as wireless fidelity (Wi-Fi) communication, Bluetooth communication, or cellular 2nd/3rd/4th/5th generation (2G/3G/4G/5G) communication. It should be understood that another communication manner, including a future communication manner, may be further used between the server and the electronic device. This is not specifically limited herein. It should be noted that "one or more second electronic devices" in this embodiment of this application is merely used to represent an electronic device other than the first electronic device, but whether types of the plurality of electronic devices are the same is not limited.

The electronic devices may be various types of devices provided with cameras and display components. For example, the electronic device may be a terminal device such as a mobile phone, a tablet computer, a notebook computer, or a video recorder (a mobile phone is used as an example of the electronic device in FIG. 1). Alternatively, the electronic device may be a device used for interaction in a virtual scenario, including VR glasses, an AR device, an MR interaction device, or the like. Alternatively, the electronic device may be a wearable electronic device such as a smartwatch or a smart band. Alternatively, the electronic device may be a device carried in a carrying device such as a vehicle, an unmanned vehicle, an unmanned aerial vehicle, or an industrial robot. A specific form of the electronic device is not specially limited in embodiments of this application.

In addition, the electronic device may also be referred to as user equipment (UE), a subscriber station, a mobile unit, a subscriber unit, a wireless unit, a remote unit, a mobile device, a wireless device, a wireless communication device, a remote device, a mobile subscriber station, a terminal device, an access terminal, a mobile terminal, a wireless terminal, a smart terminal, a remote terminal, a handheld terminal, a user agent, a mobile client, a client, or another proper term.

The server may be one or more physical servers (one physical server is used as an example in FIG. 1), or may be a computer cluster, or may be a virtual machine or a cloud server in a cloud computing scenario, or the like.

In this embodiment of this application, a virtual scenario application (APP) such as a VR application, an AR application, or an MR application may be installed on the electronic device, and the VR application, the AR application, or the MR application may be run based on a user operation (for example, tap, touch, slide, shake, or voice control). The electronic device may collect visual information of any object in an environment by using a sensor, and then display a virtual object on a display component based on the collected visual information. The virtual object may be a virtual object (namely, an object in a virtual environment) in a VR scenario, an AR scenario, or an MR scenario.

In this embodiment of this application, a navigation, detection, or control application may be installed on the electronic device, and a corresponding application is run based on operations and control of a user or a preset program. The electronic device may run applications such as route planning, object detection, and carrying device operations and control based on a pose and other status information of the electronic device in a current environment.

The pose is location and orientation information of the electronic device, and may be an absolute pose in the world coordinate system, or may be a relative pose relative to a point in an environment.

The visual information in embodiments of this application includes but is not limited to an image video (without depth information) collected by a camera, an image video (with depth information) collected by a depth sensor, data collected by a lidar (LiDAR), and data collected by a millimeter-wave radar (RaDAR).

It should be noted that, in this embodiment of this application, the virtual scenario application in the electronic device may be an application built in the electronic device, or may be an application that is provided by a third-party service provider and that is installed by the user. This is not specifically limited herein.

In this embodiment of this application, a simultaneous localization and mapping (SLAM) system may be further configured for the electronic device. The SLAM system can create a map in a completely unknown environment, and use the map to perform positioning, pose (location and posture) determining, navigation, and the like. In this embodiment of this application, a map created by the SLAM system is referred to as a SLAM map. The SLAM map may be understood as a map drawn by the SLAM system based on environment information collected by a collection device. The collection device may include a visual information collection apparatus and an inertia measurement unit (IMU) in the electronic device. The visual information collection apparatus may include, for example, a camera, a depth camera, a lidar, and a millimeter-wave radar. The IMU may include, for example, a sensor such as a gyroscope and an accelerometer.

In embodiments of this application, the SLAM map is also referred to as a 3D map. It should be noted that the 3D map includes but is not limited to a SLAM map, and may further include a three-dimensional map created by using another technology. This is not specifically limited in embodiments of this application.

In a possible implementation, the 3D map may include a plurality of 3D map points, and correspondingly, data of the 3D map may include data of the plurality of 3D map points. The 3D map point is a point of interest or a point having a significant feature in an environment.

A possible manner of obtaining a 3D map point is to use a plurality of devices such as a lidar, aerial photography (tilt photography) from an angle of view of an unmanned aerial vehicle, a high-definition panoramic camera, a high-definition industrial camera to perform shooting, and extract a 3D map point, from data obtained through shooting by the foregoing devices, by using a method such as ORB, scale-invariant feature transform (SIFT), speeded up robust features (SURF), binary robust independent elementary features (BRIEF), a binary robust invariant scalable key point (BRISK), a fast retina keypoint (FREAK), D2Net, or a self-supervised training feature point detection and descriptor extraction method (SuperPoint).

Data of a 3D map point may include the following.

(1) 3D Map Point Descriptor

The 3D map point descriptor is a vector, used to represent a local feature of a corresponding 3D map point. In a visual positioning algorithm, a 3D map point descriptor is used for matching between 3D map points. A possible method is: calculating a distance (which may be a Euclidean distance, an inner product distance, a Hamming distance, or the like) between two 3D map point descriptors; and when the distance is less than a threshold, considering that the two 3D map points match.

(2) 3D Map Point Spatial Location

A 3D map point spatial location may be represented by using X, Y, and Z on three-dimensional spatial axes, or may be represented by using a longitude, a latitude, and an altitude, or may be represented by using polar coordinates or the like. A method for representing a 3D map point spatial location is not specifically limited in embodiments of this application. The 3D map point spatial location may be an absolute location of a 3D map point or a relative location of a 3D map point. For example, a central location of an entire area is used as an origin, and all 3D map point spatial locations are offset locations relative to a spatial location of the origin.

In embodiments of this application, a number may be allocated to each 3D map point and written into data of the 3D map, or a storage sequence of a plurality of 3D map points in a memory may be used to implicitly indicate numbers of the 3D map points. It should be noted that the sequence of the plurality of 3D map points included in the 3D map is meaningless. Therefore, the foregoing numbers may be considered as identifiers used to identify the 3D map points, to distinguish between the 3D map points. However, the numbers are not intended to limit the sequence of the plurality of 3D map points. For example, a 3D map includes three 3D map points whose numbers are respectively 1, 2, and 3, and the three 3D map points may be processed in an order of 1, 2, and 3, or in an order of 3, 2, and 1, or in an order of 2, 1, and 3, or the like.

In a possible implementation, the data of the 3D map further includes a plurality of area descriptors, and any one of the plurality of area descriptors describes features of some or all 3D map points of the plurality of 3D map points. To be specific, for any one of the plurality of area descriptors, the area descriptor may describe features of some or all 3D map points of the plurality of 3D map points. In this case, the area descriptor and the 3D map point are in a one-to-many relationship. A feature of each 3D map point of the plurality of 3D map points may be described by some or all area descriptors of the plurality of area descriptors. In this case, the 3D map point and the area descriptor are in a one-to-many relationship. It can be learned that a plurality of area descriptors and a plurality of 3D map points are in a many-to-many relationship. A method for generating an area descriptor includes but is not limited to a conventional method such as a BOW and a vector of locally aggregated descriptors (VLAD), and a novel method based on NetV- LAD or artificial intelligence (AI). Similarly, a plurality of area descriptors may be identified by numbers to distinguish between the plurality of area descriptors. Similarly, however, the numbers are not intended to limit a sequence of the plurality of area descriptors.

In a possible implementation, the data of the 3D map further includes a correspondence between a 3D map point and a descriptor. The correspondence clearly describes which 3D map points any descriptor corresponds to and which descriptors any 3D map point corresponds to.

Optionally, the foregoing correspondence may be explicitly described by using a correspondence table between a number of an area descriptor and a number of a 3D map point. For example, the 3D map includes three area descriptors whose numbers are T1 to T3, and five 3D map points. Numbers of six 3D map point spatial locations are P1 to P6, and numbers of six 3D map point descriptors are F1 to F6. The correspondence table is shown in Table 1.

TABLE 1

| Area descriptor | 3D map point spatial location | 3D map point descriptor |
|---|---|---|
| T1 | $P_1$ | $F_1$ |
|    | $P_2$ | $F_2$ |
|    | $P_3$ | $F_3$ |
| T2 | $P_2$ | $F_2$ |
|    | $P_3$ | $F_3$ |
| T3 | $P_3$ | $F_3$ |
|    | $P_4$ | $F_4$ |
|    | $P_5$ | $F_5$ |
|    | $P_6$ | $F_6$ |

It should be noted that, Table 1 is an example of a correspondence table between a number of an area descriptor and a number of a 3D map point. The correspondence table may alternatively be presented in another format or manner. This is not specifically limited in this application.

Optionally, the foregoing correspondence may alternatively be implicitly described by using storage locations of an area descriptor and a 3D map point. For example, T1 is first stored in the memory, and then data of $P_1$, $P_2$, and $P_3$ is stored; then T2 is stored, and then data of $P_2$ and $P_3$ is stored; and finally, T3 is stored, and then data of $P_3$, $P_4$, $P_5$, and $P_6$ is stored.

Figure 2:
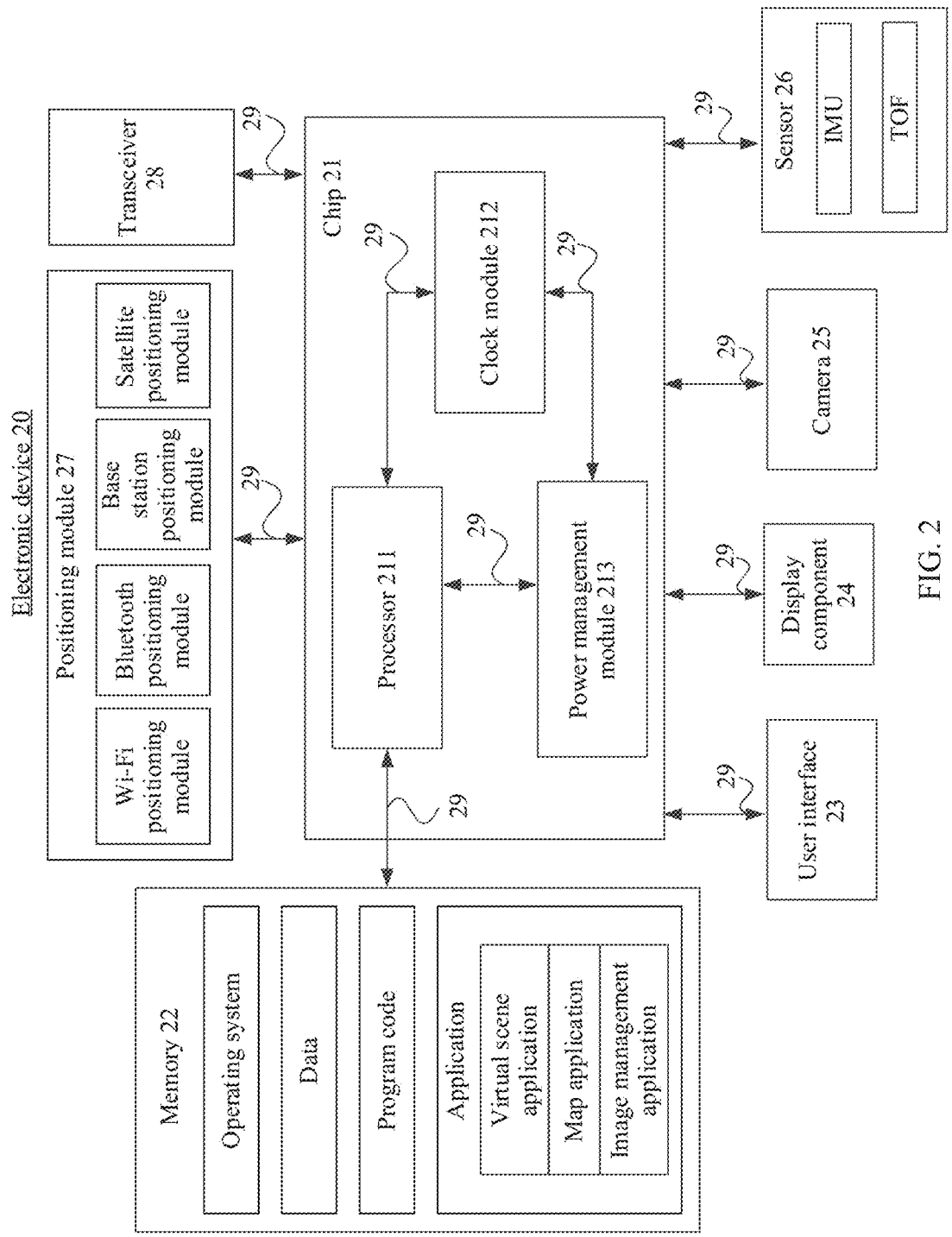
FIG. 2 is a schematic diagram of a structure of an electronic device 20 according to an embodiment of this application.

FIG. 2 is a schematic diagram of a structure of an electronic device 20 according to an embodiment of this application. As shown in FIG. 2, the electronic device 20 may be at least one of the first electronic device and one or more second electronic devices in the embodiment shown in FIG. 1. It should be understood that the structure shown in FIG. 2 does not constitute a specific limitation on the electronic device 20. In some other embodiments of this application, the electronic device 20 may include more or fewer components than those shown in FIG. 2, or combine some components, or split some components, or have different component arrangements. The components shown in FIG. 2 may be implemented in hardware including one or more signal processing and/or application-specific integrated circuits, software, or a combination of hardware and software.

The electronic device 20 may include a chip 21, a memory 22 (one or more computer-readable storage media), a user interface 23, a display component 24, a camera 25, a sensor 26, a positioning module 27 configured to perform device positioning, and a transceiver 28 configured to perform communication. These components may communicate with each other by using one or more buses 29.

One or more processors 211, a clock module 212, and a power management module 213 may be integrated into the chip 21. The clock module 212 integrated in the chip 21 is mainly configured to provide a timer required for data transmission and timing control for the processor 211. The timer may implement clock functions of data transmission and timing control. The processor 211 may execute an operation and generate an operation control signal based on an instruction operation code and a timing signal, to complete control of instruction fetching and instruction execution. The power management module 213 integrated in the chip 21 is mainly configured to provide a stable and high-precision voltage for the chip 21 and another component of the electronic device 20.

The processor 211 may also be referred to as a central processing unit (CPU). The processor 211 may include one or more processing units. For example, the processor 211 may include an application processor (AP), a modem processor, a graphics processing unit (GPU), an image signal processor (ISP), a controller, a video codec, a digital signal processor (DSP), a baseband processor, a neural processing unit (NPU), and/or the like. Different processing units may be independent components, or may be integrated into one or more processors.

In a possible implementation, the processor 211 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) port, and/or the like.

The memory 22 may be connected to the processor 211 through the bus 29, or may be coupled to the processor 311, and is configured to store various software programs and/or a plurality of groups of instructions. The memory 22 may include a high-speed random access memory (for example, a cache), or may include a nonvolatile memory, for example, one or more magnetic disk storage devices, a flash memory device, or another nonvolatile solid-state storage device. The memory 22 may store an operating system, for example, an embedded operating system such as Android, Apple (iOS), Microsoft (Windows), or Linux. The memory 22 may further store data, for example, image data, point cloud data, 3D map data, pose data, coordinate system conversion information, and map update information. The memory 22 may further store computer-executable program code. The computer-executable program code includes instructions, for example, communication program instructions and related program instructions of a SLAM system. The memory 22 may further store one or more applications, for example, a virtual scenario application such as AR/VR/MR, a map application, an image management application, and a navigation and control application. The memory 22 may further store a user interface program. The user interface program may vividly display content of an application, for example, a virtual object in a virtual scenario such as AR/VR/MR, by using a graphical operation interface, present the content by using the display component 24, and receive a control operation performed by a user on the application by using an input control such as a menu, a dialog box, or a button.

The user interface 23 may be, for example, a touch panel. The touch panel may detect an instruction of an operation performed by the user on the touch panel. The user interface 23 may be, for example, a keypad, a physical button, or a mouse.

The electronic device 20 may include one or more display components 24. The electronic device 20 may implement a display function jointly by using the display component 24, a graphics processing unit (GPU) and an application processor (AP) in the chip 21, and the like. The GPU is a microprocessor for implementing image processing, and is connected to the display component 24 and the application processor. The GPU performs mathematical and geometric calculation for graphics rendering. The display component 24 may display interface content output by the electronic device 20, for example, display an image, a video, and the like in a virtual scenario such as AR/VR/MR. The interface content may include an interface of a running application, a system-level menu, and the like, and may include the following interface elements: input interface elements, such as a button (Button), a text input box (Text), a scrollbar (Scrollbar), and a menu (Menu); and output interface elements, such as a window (Window), a label (Label), an image, a video, and an animation.

The display component 24 may be a display panel, a lens (for example, VR glasses), a projection screen, or the like. The display panel may also be referred to as a display screen, for example, may be a touchscreen, a flexible screen, a curved screen, or the like, or may be another optical component. It should be understood that the display screen of the electronic device in embodiments of this application may be a touchscreen, a flexible screen, a curved screen, or a screen in another form. In other words, the display screen of the electronic device has a function of displaying an image, and a specific material and shape of the display screen are not specifically limited.

For example, when the display component 24 includes a display panel, the display panel may use a liquid crystal display (LCD), an organic light-emitting diode (OLED), an active matrix organic light-emitting diode or an active-matrix organic light-emitting diode (AMOLED), a flexible light-emitting diode (FLED), a MiniLed, a MicroLed, a Micro-oLed, a quantum dot light-emitting diode (QLED), or the like. In addition, in a possible implementation, the touch panel in the user interface 23 may be coupled to the display panel in the display component 24. For example, the touch panel may be disposed below the display panel, the touch panel is configured to detect touch pressure that acts on the display panel when the user enters a touch operation (for example, tap, slide, or touch) by using the display panel, and the display panel is configured to display content.

The camera 25 may be a monocular camera, a binocular camera, or a depth camera, and is configured to photograph/record an environment to obtain an image/video image. The image/video image collected by the camera 25 may be, for example, used as input data of the SLAM system, or an image/video may be displayed by using the display component 24.

In a possible implementation, the camera 25 may also be considered as a sensor. The image collected by the camera 25 may be in an IMG format, or may be in another format type. This is not specifically limited in embodiments of this application.

The sensor 26 may be configured to collect data related to a status change (for example, rotation, swing, movement, or jitter) of the electronic device 20. The data collected by the sensor 26 may be used as input data of the SLAM system. The sensor 26 may include one or more sensors, for example, an inertia measurement unit (IMU) and a time of flight (TOF) sensor. The IMU may include sensors such as a gyroscope and an accelerometer. The gyroscope is configured to measure an angular velocity of the electronic device when the electronic device moves, and the accelerometer is configured to measure acceleration of the electronic device when the electronic device moves. The TOF sensor may include an optical transmitter and an optical receiver. The optical transmitter is configured to emit light outward, for example, laser light, an infrared ray, or a radar wave. The optical receiver is configured to detect reflected light, for example, reflected laser light, an infrared ray, or a radar wave.

It should be noted that the sensor 26 may further include more other sensors, such as an inertia sensor, a barometer, a magnetometer, and a wheel speedometer. This is not specifically limited in embodiments of this application.

The positioning module 27 is configured to implement physical positioning of the electronic device 20, for example, configured to obtain an initial location of the electronic device 20. The positioning module 27 may include one or more of a Wi-Fi positioning module, a Bluetooth positioning module, a base station positioning module, and a satellite positioning module. A global navigation satellite system (GNSS) may be disposed in the satellite positioning module to assist in positioning. The GNSS is not limited to a BeiDou system, a Global Positioning System (GPS) system, a global navigation satellite system (GLONASS) system, and a Galileo Navigation Satellite System (Galileo) system.

The transceiver 28 is configured to implement communication between the electronic device 20 and another device (for example, a server or another electronic device). The transceiver 28 integrates a transmitter and a receiver, which are respectively configured to send and receive a radio frequency signal. In an exemplary implementation, the transceiver 28 includes but is not limited to an antenna system, a radio frequency (RF) transceiver, one or more amplifiers, a tuner, one or more oscillators, a digital signal processor, a codec (CODEC) chip, a subscriber identity module (SIM) card, a storage medium, and the like. In a possible implementation, the transceiver 28 may be alternatively implemented on a separate chip. The transceiver 28 supports at least one data network communication in at least one data network of 2G/3G/4G/5G or the like, and/or supports at least one of the following short-range wireless communication manners: Bluetooth (BT) communication, Wireless Fidelity (Wi-Fi) communication, near-field communication (NFC), infrared (IR) wireless communication, ultra-wideband (UWB) communication, and ZigBee protocol communication.

In this embodiment of this application, the processor 211 runs program code stored in the memory 22, to perform various function applications and data processing of the electronic device 20.

Figure 3:
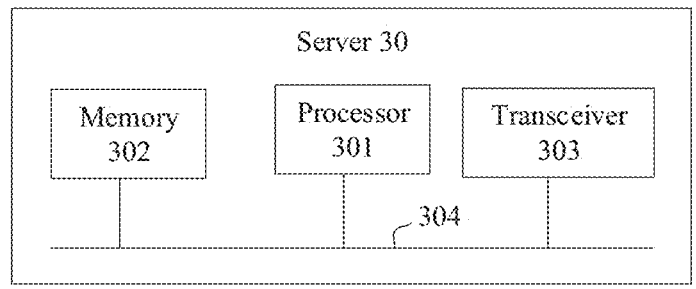
FIG. 3 is a schematic diagram of a structure of a server 30 according to an embodiment of this application.

FIG. 3 is a schematic diagram of a structure of a server 30 according to an embodiment of this application. As shown in FIG. 3, the server 30 may be the server in the embodiment shown in FIG. 1. The server 30 includes a processor 301, a memory 302 (one or more computer-readable storage media), and a transceiver 303. These components may communicate with each other by using one or more buses 304.

The processor 301 may be one or more CPUs. When the processor 301 is one CPU, the CPU may be a single-core CPU, or may be a multi-core CPU.

The memory 302 may be connected to the processor 301 through the bus 304, or may be coupled to the processor 301, and is configured to store various program code and/or a plurality of groups of instructions and data (for example, map data and pose data). In an exemplary implementation, the memory 302 includes but is not limited to a random access memory (RAM), a read-only memory (ROM), an erasable programmable read-only memory (EPROM), a portable read-only memory (Compact Disc Read-Only Memory, CD-ROM), or the like.

The transceiver 303 mainly integrates a receiver and a transmitter. The receiver is configured to receive data (for example, a request or an image) sent by an electronic device, and the transmitter is configured to send data (for example, map data or pose data) to the electronic device.

It should be understood that the server 30 shown in FIG. 3 is merely an example provided in this embodiment of this application, and the server 30 may further have more components than those shown in the figure. This is not specifically limited in embodiments of this application.

In this embodiment of this application, the processor 301 runs program code stored in the memory 302, to perform various function applications and data processing of the server 30.

The term "coupling" used in embodiments of this application means a direct connection or a connection through one or more intermediate components or circuits.

Figure 4A:
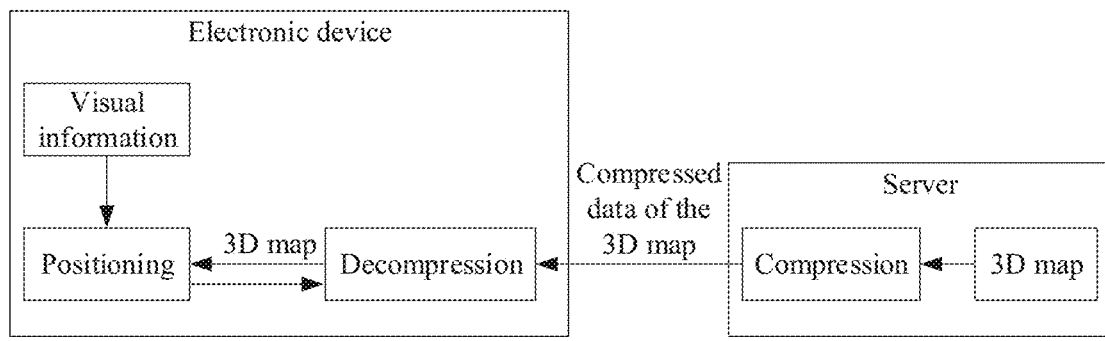
FIG. 4*a* to FIG. 4*f* are schematic diagrams of various application scenarios according to an embodiment of this application.

FIG. 4*a* is a schematic diagram of an application scenario according to an embodiment of this application. As shown in FIG. 4*a*, in the application scenario, an electronic device collects visual information by using a sensor, and determines a current pose of the electronic device with reference to the visual information and a 3D map from a server.

The 3D map is provided by the server. To be specific, the server creates the 3D map, then compresses the 3D map, and transmits compressed data of the 3D map to the electronic device. After receiving the compressed data of the 3D map, the electronic device performs decompression to obtain reconstructed data of the 3D map, and determines the current pose of the electronic device with reference to the collected visual information and the reconstructed data of the 3D map. The pose is location information of the electronic device, and may be an absolute pose in the world coordinate system, or may be a relative pose relative to a point in an environment.

In this embodiment of this application, the server may create the 3D map in advance, compress the 3D map, and then store compressed data of the 3D map locally. In this way, storage space can be saved. In addition, the server may transmit the compressed data of the 3D map to another device, for example, a cloud storage.

1. The server creates the 3D map, compresses the 3D map to obtain the compressed data of the 3D map, and stores the compressed data locally.

The server compresses the 3D map, to save local storage space.

2. The electronic device sends a map download request to the server. The map download request is triggered in two manners:

(1) A user starts a map application installed on the electronic device, and the application uploads, to a server corresponding to the application, location information obtained based on GPS positioning or Wi-Fi positioning. The upload operation may trigger a map download request. Because uploaded content includes the location information, the server may perform preliminary estimation based on the location information, and transmit, to the electronic device, compressed data of a 3D map of an area to which a positioning point indicated by the location information belongs. A range of the area to which the positioning point indicated by the location information belongs may be preset. For example, the area to which the positioning point belongs may be an administrative region (including a county, a city, a country, or an administrative region) at any level in which the positioning point is located, or may be a circular area centered on the positioning point and using a specified distance as a radius.

(2) The user starts a map application installed on the electronic device, and actively enters or selects an area on the application. For example, the user actively enters "xx business center", or selects "street A" from a list of "street A, street B, and street C". The foregoing operations of the user may trigger a map download request. Regardless of whether the user enters or selects a geographical location, the server accordingly transmits compressed data of a 3D map of the geographical location to the electronic device.

It should be understood that, in this embodiment of this application, in addition to the foregoing two manners, another manner may be used for triggering a map download request. For example, the electronic device automatically detects whether a condition for downloading a 3D map or starting downloading a 3D map is satisfied, or the electronic device starts downloading a 3D map upon detecting an ambient light change or an environment change, to request the server to download a 3D map of an area range. A size of the area range is not specifically limited.

3. The server sends the compressed data of the 3D map to the electronic device.

4. The electronic device collects the visual information by using the sensor.

It should be noted that step 3 and step 4 are independent of each other, and a sequence is not limited.

5. The electronic device decompresses the compressed data of the 3D map to obtain the reconstructed data of the 3D map.

6. The electronic device performs positioning in the 3D map based on the visual information, to obtain a pose corresponding to the visual information.

After receiving the compressed data of the 3D map, the electronic device does not need to immediately decompress the compressed data, and needs to decompress the compressed data to obtain the reconstructed data of the 3D map only before performing positioning based on the visual information. For example, the user may pre-download compressed data of a 3D map of an area range by downloading an "offline map", and decompress the compressed data of the 3D map only when positioning is required.

Figure 4B:
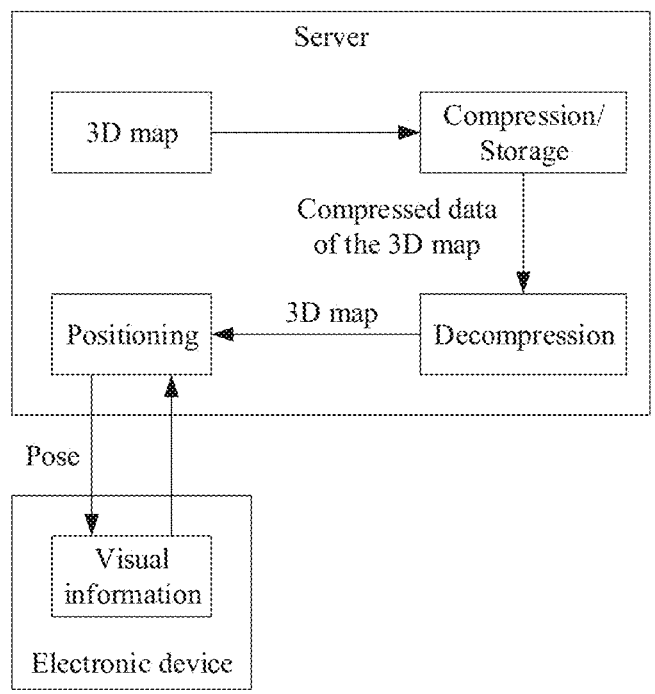

FIG. 4*b* is a schematic diagram of an application scenario according to an embodiment of this application. As shown in FIG. 4*b*, in the application scenario, an electronic device collects visual information by using a sensor, and a server determines a current pose of the electronic device with reference to the visual information from the electronic device and a 3D map.

The 3D map is provided by the server. To be specific, the server creates the 3D map, then compresses the 3D map, and stores compressed data of the 3D map locally. When receiving the visual information from the electronic device, the server performs decompression to obtain reconstructed data of the 3D map, and determines the current pose of the electronic device with reference to the visual information and the reconstructed data of the 3D map.

1. The server creates the 3D map, compresses the 3D map to obtain the compressed data of the 3D map, and stores the compressed data locally.

2. The electronic device collects the visual information by using the sensor.

3. The electronic device sends the visual information to the server.

4. The server decompresses the compressed data of the 3D map to obtain the reconstructed data of the 3D map.

It should be understood that the server compresses the 3D map to save storage space.

5. The server performs positioning in the 3D map based on the visual information, to obtain a pose corresponding to the visual information.

6. The server sends the pose to the electronic device.

Figure 4C:
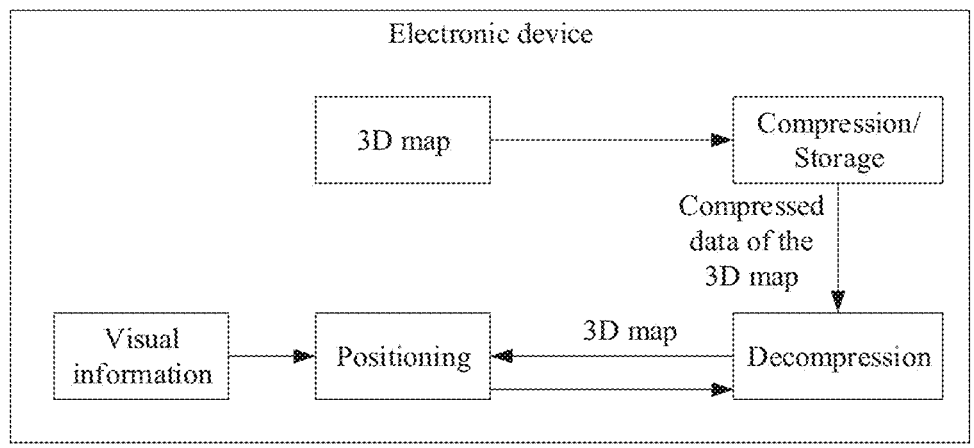

FIG. 4c is a schematic diagram of an application scenario according to an embodiment of this application. As shown in FIG. 4c, in the application scenario, an electronic device collects visual information by using a sensor, and determines a current pose of the electronic device with reference to the collected visual information and a 3D map.

The 3D map is provided by the electronic device. To be specific, the electronic device creates the 3D map, then compresses the 3D map, and stores compressed data of the 3D map locally. When the visual information is collected, the electronic device performs decompression to obtain reconstructed data of the 3D map, and determines the current pose of the electronic device with reference to the collected visual information and the reconstructed data of the 3D map.

1. The electronic device creates the 3D map, compresses the 3D map to obtain the compressed data of the 3D map, and stores the compressed data locally.

It should be understood that the electronic device compresses the 3D map to save storage space.

2. The electronic device collects the visual information by using the sensor.

3. The electronic device decompresses the compressed data of the 3D map to obtain the reconstructed data of the 3D map.

4. The electronic device performs positioning in the 3D map based on the visual information, to obtain a pose corresponding to the visual information.

Figure 4D:
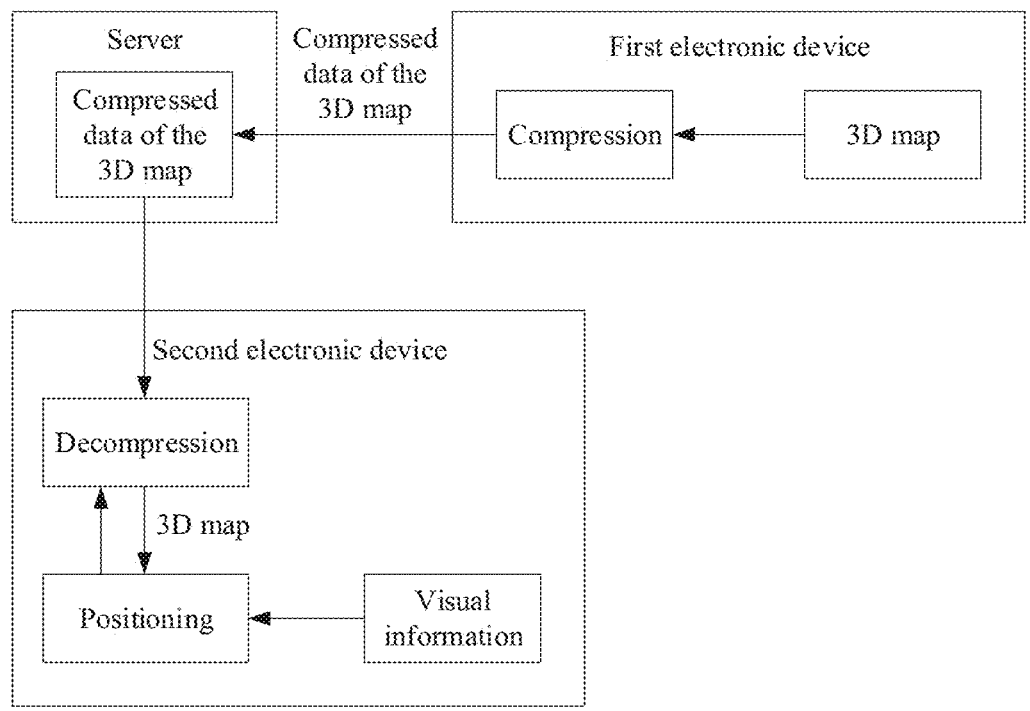

FIG. 4d is a schematic diagram of an application scenario according to an embodiment of this application. As shown in FIG. 4d, in the application scenario, a second electronic device collects visual information by using a sensor, and determines a current pose of the second electronic device with reference to the visual information and a 3D map from a server.

The 3D map is created by the first electronic device. To be specific, the first electronic device creates the 3D map, compresses the 3D map, and then sends compressed data of the 3D map to the server. The server then sends the compressed data of the 3D map to the second electronic device. The second electronic device performs decompression to obtain reconstructed data of the 3D map, and determines the current pose of the second electronic device with reference to the collected visual information and the reconstructed data of the 3D map.

In this embodiment of this application, the first electronic device may create the 3D map in advance, compress the 3D map, and then transmit the compressed data of the 3D map to the server. In this way, transmission bandwidth can be reduced.

1. The first electronic device creates the 3D map, compresses the 3D map to obtain the compressed data of the 3D map.

2. The first electronic device sends the compressed data of the 3D map to the server.

The first electronic device compresses the 3D map and then transmits the compressed data of the 3D map, to reduce transmission bandwidth, and improve transmission efficiency.

3. The second electronic device sends a map download request to the server.

The second electronic device may send the map download request based on a trigger manner shown in FIG. 4a.

4. The server sends the compressed data of the 3D map to the second electronic device.

5. The second electronic device decompresses the compressed data of the 3D map to obtain the reconstructed data of the 3D map.

6. The second electronic device collects the visual information by using the sensor.

7. The second electronic device performs positioning in the 3D map based on the visual information, to obtain a pose corresponding to the visual information.

Figure 4E:
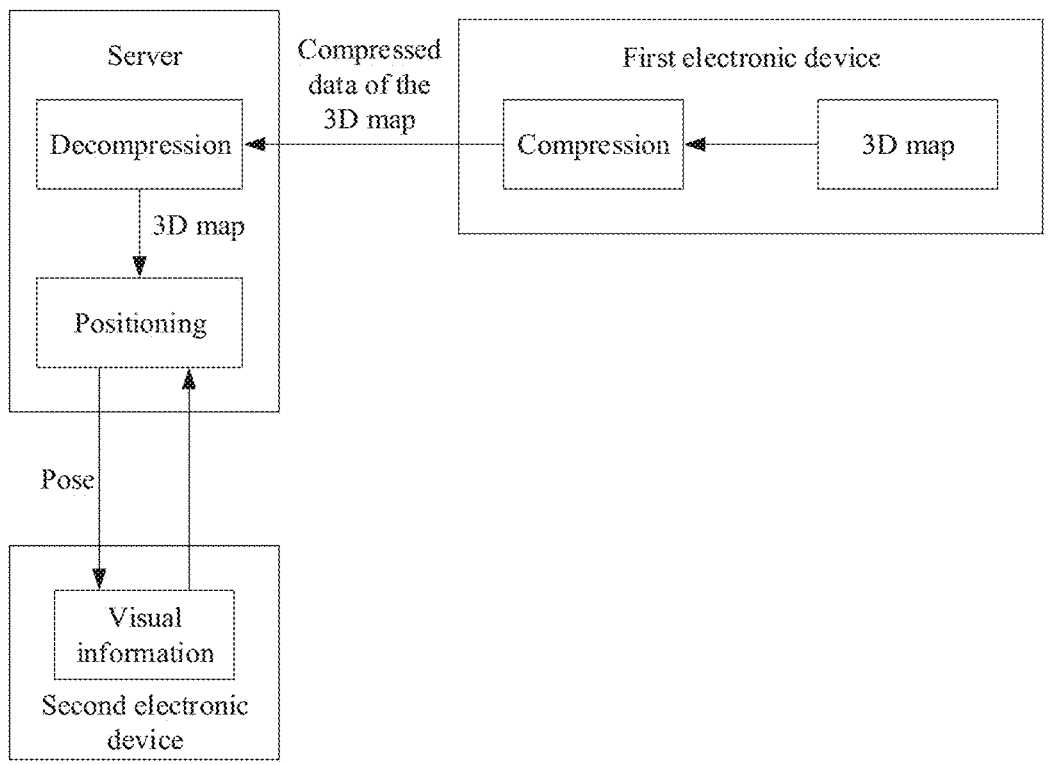

FIG. 4e is a schematic diagram of an application scenario according to an embodiment of this application. As shown in FIG. 4e, in the application scenario, a second electronic device collects visual information by using a sensor, and a server determines a current pose of the second electronic device with reference to the visual information from the second electronic device and a 3D map from a first electronic device.

The 3D map is created by the first electronic device. To be specific, the first electronic device creates the 3D map, compresses the 3D map, and then sends compressed data of the 3D map to the server. The server performs decompression to obtain reconstructed data of the 3D map, and determines the current pose of the second electronic device with reference to the visual information from the second electronic device and the reconstructed data of the 3D map.

1. The first electronic device creates the 3D map, compresses the 3D map to obtain the compressed data of the 3D map.

2. The first electronic device sends the compressed data of the 3D map to the server.

3. The second electronic device collects the visual information by using the sensor.

4. The second electronic device sends a positioning request to the server, where the positioning request carries the visual information.

5. The server decompresses the compressed data of the 3D map to obtain the reconstructed data of the 3D map.

6. The server performs positioning in the 3D map based on the visual information, to obtain a pose corresponding to the visual information.

7. The server sends, to the second electronic device, the pose obtained through positioning.

Figure 4F:
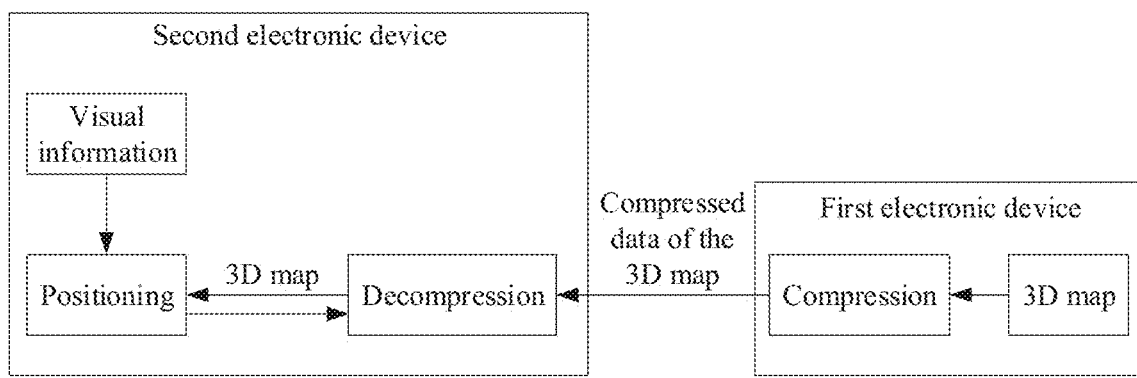

FIG. 4f is a schematic diagram of an application scenario according to an embodiment of this application. As shown in FIG. 4f, in the application scenario, a second electronic device collects visual information by using a sensor, and determines a current pose of the second electronic device with reference to the visual information and a 3D map from a first electronic device.

The 3D map is created by the first electronic device. To be specific, the first electronic device creates the 3D map, compresses the 3D map, and then sends compressed data of the 3D map to the second electronic device. The second electronic device performs decompression to obtain reconstructed data of the 3D map, and determines the current pose of the second electronic device with reference to the collected visual information and the 3D map from the first electronic device.

1. The first electronic device creates the 3D map, compresses the 3D map to obtain the compressed data of the 3D map, and stores the compressed data locally.

2. The second electronic device sends a map download request to the first electronic device.

3. The first electronic device sends the compressed data of the 3D map to the second electronic device.

4. The second electronic device decompresses the compressed data of the 3D map to obtain the reconstructed data of the 3D map.

5. The second electronic device collects the visual information by using the sensor.

6. The second electronic device performs positioning in the 3D map based on the visual information, to obtain a pose corresponding to the visual information.

A positioning algorithm used in the embodiments shown in FIG. 4a to FIG. 4f may include the following.

(1) A to-be-retrieved area descriptor is extracted from the visual information, where an algorithm used for extracting the to-be-retrieved area descriptor is consistent with an algorithm for extracting an area descriptor from the 3D map.

(2) A to-be-retrieved 3D map point is extracted from the visual information, and a to-be-retrieved 3D map point spatial location and a to-be-retrieved 3D map point descriptor are obtained, where an algorithm for extracting the to-be-retrieved 3D map point descriptor is consistent with an algorithm for extracting a 3D map point descriptor from the 3D map.

(3) Retrieval is performed in a plurality of area descriptors included in data of the 3D map based on the to-be-retrieved area descriptor, to obtain a plurality of candidate area descriptors.

In embodiments of this application, a distance between the to-be-retrieved area descriptor and each area descriptor in the plurality of area descriptors may be calculated. The distance may include a Hamming distance, a Manhattan distance, a Euclidean distance, or the like. Then, at least one area descriptor that satisfies a condition (for example, the distance is less than a threshold) is selected as a candidate area descriptor.

(4) Matching is separately performed between the to-be-retrieved 3D map point descriptor and 3D map point descriptors corresponding to a plurality of candidate area descriptors. The matching is to separately calculate a similarity between the to-be-retrieved 3D map point descriptor and the 3D map point descriptors corresponding to the plurality of candidate area descriptors, to find a most similar 3D map point.

(5) The pose of the electronic device is calculated based on the found 3D map point by using a pose solution algorithm such as PnP or EPnP in ORB-SLAM2.

Figure 4G:
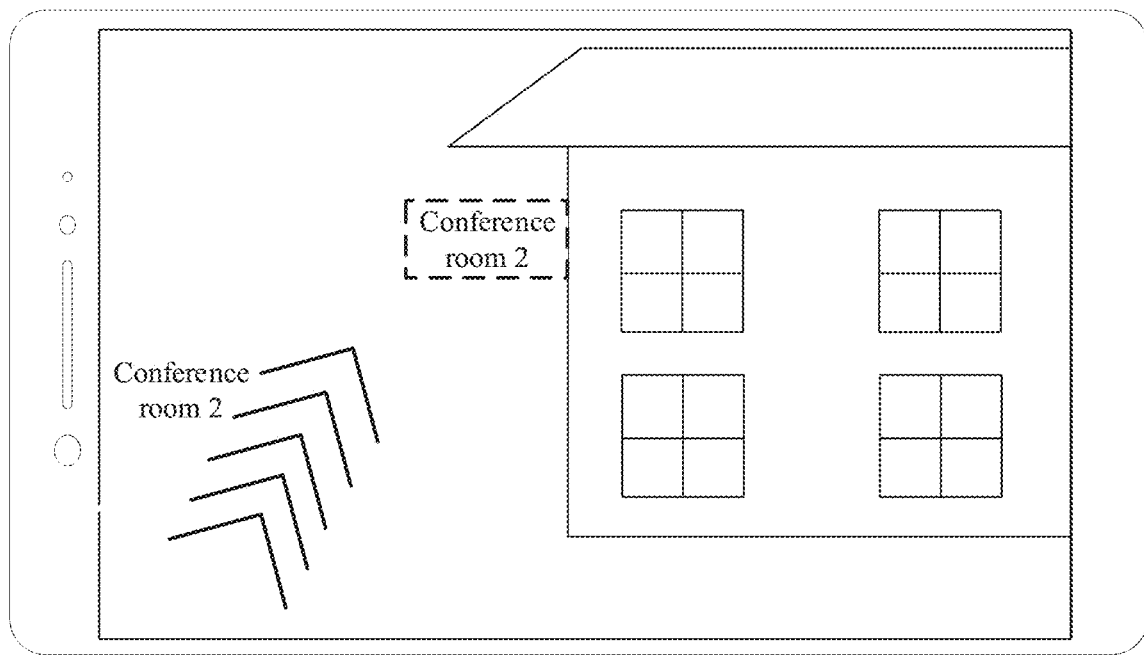
FIG. 4*g* is a schematic diagram of a user interface (for example, a user interface of a 3D map application) displayed by an electronic device according to an embodiment of this application.

In any one of the application scenarios in FIG. 4a to FIG. 4f, positioning is performed based on the 3D map in embodiments of this application, to obtain the current pose of the electronic device. The pose may be applied to fields such as AR navigation, AR human-computer interaction, assisted driving, and autonomous driving. For example, AR navigation based on the pose is used as an example. FIG. 4g is a schematic diagram of a user interface displayed by an electronic device according to an embodiment of this application. The electronic device may display, based on the pose, the user interface shown in FIG. 4g. The user interface may include an indication of a navigation arrow headed to a conference room 2, and the indication of the navigation arrow headed to the conference room 2 may be a virtual object obtained from a server based on the pose or obtained locally based on the pose. The user interface may further include visual information collected by a sensor, for example, a building shown in FIG. 4g. The user goes to the conference room 2 with reference to the user interface of the electronic device shown in FIG. 4g.

It should be noted that reconstructed data, obtained through decompression, of a 3D map in embodiments of this application may also be referred to as reconstructed data of the 3D map.

In the embodiments shown in FIG. 4a to FIG. 4f, compression and decompression are performed on the 3D map, and positioning is performed based on the reconstructed data, obtained through decompression, of the 3D map, to obtain the current pose of the electronic device. For positioning, in an implementable manner, positioning may be performed based on the reconstructed data, obtained through complete decompression, of the 3D map. In another possible implementation, a method for retrieving a 3D map provided in the following embodiments of this application may be used to obtain, through screening, at least one target 3D map descriptor by using asymmetric binary data, and then positioning may be performed by using the at least one target 3D map descriptor. Certainly, it may be understood that further retrieval may be performed in the at least one target 3D map descriptor in another retrieval manner, to obtain fewer target 3D map descriptors or a more accurate target 3D map descriptor through screening. According to the method for retrieving a 3D map provided in the following embodiments of this application, retrieval performance may be improved by using asymmetric binary data retrieval. A length of binary data of a retrieval descriptor used for retrieval is different from a length of binary data of a 3D map descriptor, so that a descriptor with a smaller length (the 3D map descriptor or the retrieval descriptor) may have a higher compression ratio, thereby saving storage space and/or transmission resource overheads, and a descriptor with a larger length (the retrieval descriptor or the 3D map descriptor) may provide more information for retrieval, thereby improving retrieval accuracy. Compared with the retrieval in the reconstructed data, obtained through complete decompression, of the 3D map, the method for retrieving a 3D map provided in the following embodiments of this application can improve retrieval efficiency and ensure retrieval accuracy. The following describes the method for retrieving a 3D map.

Retrieval of a 3D map in embodiments of this application means finding some most similar or most related 3D map points from a plurality of 3D map points on the 3D map.

A length of binary data in embodiments of this application may be a quantity of bits (also referred to as a bit quantity) of the binary data. For example, if the binary data is 110, the quantity of bits in the binary data is 3.

It should be noted that the retrieval method provided in embodiments of this application may also be applied to another technical field, for example, retrieval of image or video data, retrieval of audio data, and retrieval of point cloud data.

Based on the foregoing description, the following provides a method for retrieving a 3D map according to an embodiment of this application. For convenience, the method embodiments described below are expressed as a combination of a series of action steps. However, a person skilled in the art should understand that exemplary implementations of the technical solutions of this application are not limited to a sequence of the described series of action steps.

Figure 5:
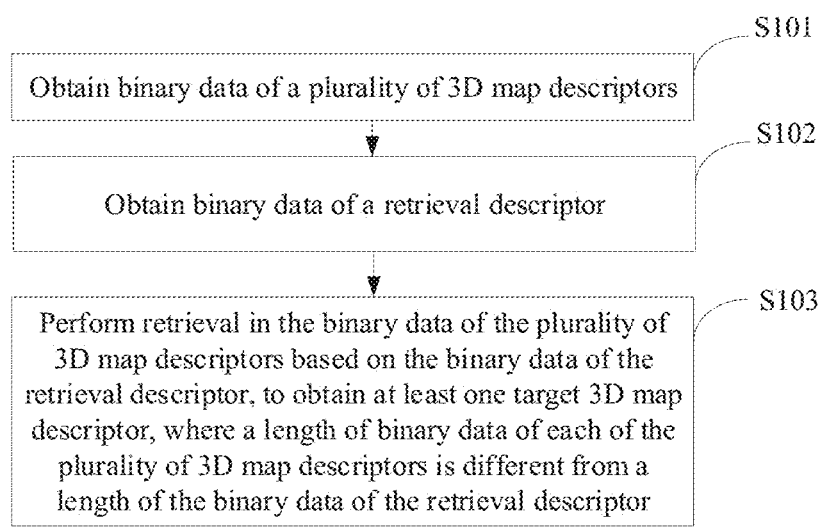
FIG. 5 is a schematic flowchart of a method for retrieving a 3D map according to an embodiment of this application.

Refer to FIG. 5. FIG. 5 is a schematic flowchart of a method for retrieving a 3D map according to an embodiment of this application. In some implementations, the method may be applied to the electronic device (for example, the first electronic device or the second electronic device) in any one of examples of FIG. 1 to FIG. 4f, or may be applied to the server in any one of examples of FIG. 1 to FIG. 4f. An execution body for performing the method for retrieving a 3D map in embodiments of this application may also be referred to as a decompressor end or a decoder end. The method includes but is not limited to the following steps.

S101: Obtain binary data of a plurality of 3D map descriptors.

Any one of the plurality of 3D map descriptors corresponds to at least one 3D map point of a 3D map. The 3D map descriptor may be a vector, for example, a 128-dimensional vector or a 512-dimensional vector. A quantity of dimensions of the 3D map descriptor is not limited to the foregoing example, and may be another value. Examples are not described one by one in this embodiment of this application. Specifically, the 3D map descriptor may be an area descriptor or a 3D map point descriptor. One area descriptor may correspond to a plurality of 3D map points. For specific explanations and descriptions, refer to the explanations and descriptions in the foregoing embodiment. Details are not described herein again. The binary data of the plurality of 3D map descriptors is compressed data obtained after binarization is performed on the plurality of original 3D map descriptors. Bit overheads of the binary data of the plurality of 3D map descriptors are obviously less than bit overheads of the plurality of original 3D map descriptors.

A retrieval range of the 3D map in this embodiment of this application may be preset or dynamically determined based on device information of an electronic device that collects visual information. For example, the retrieval range of the 3D map may be a plurality of 3D map descriptors in a 3D map locally stored in a device. For another example, the retrieval range of the 3D map may be a plurality of 3D map descriptors determined in the 3D map based on location information (for example, location information obtained through positioning by using the GPS or the BeiDou) of the electronic device. An example is provided for explanations and descriptions with reference to FIG. 4g. The cloud server may receive location information sent by the electronic device, determine a plurality of 3D map descriptors in a 3D map based on the location information, perform retrieval in the plurality of 3D map descriptors to obtain a target 3D map descriptor, and perform positioning based on the target 3D map descriptor to obtain a pose of the electronic device. The cloud server may obtain corresponding virtual object information based on the pose, and send the virtual object information to the electronic device, so that the electronic device displays the user interface shown in FIG. 4g. The user interface may include an indication of navigation arrow headed to a conference room 2, and the indication of the navigation arrow headed to the conference room 2 may be obtained based on the virtual object information.

It should be noted that the device information of the electronic device may be information about a time at which the electronic device collects the visual information, type information (for example, a wearable device or an intelligent screen) of the electronic device, or the like. Examples are not described one by one in this embodiment of this application.

Binarization means processing an original 3D map descriptor into a binary string represented by binary symbols, that is, binary data. Bit overheads of the binary data are usually obviously less than bit overheads of original data (for example, an original 3D map descriptor), to save storage space and/or transmission resource overheads. In addition, a calculation amount of a Hamming distance between the binary data is usually less than a calculation amount of a distance such as a Euclidean distance or an inner product distance between the original data, thereby reducing calculation complexity.

Binarization may be, for example, hashing. A principle of hashing is to map an original 3D map descriptor to a Hamming space (binary space), to generate a binary hash code. That is, the binary data may be a hash code. Bit overheads of a hash code are usually obviously less than bit overheads of original data, to save storage and transmission bandwidth. In addition, a calculation amount of a Hamming distance between hash codes is usually less than that of a Euclidean distance of the original data, thereby reducing calculation complexity. Binarization includes but is not limited to: iterative quantization (ITQ) hashing, locality-sensitive hashing (LSH), spectral hashing, or the like. In some embodiments, the foregoing binarization may be at least one stage of binarization. Two-stage binarization is used as an example, and different binarization manners may be used for the two-stage binarization.

Manners of obtaining the binary data of the plurality of 3D map descriptors include but are not limited to the following several implementations: Manner 1: Compressed data of the 3D map is obtained from a memory, where the compressed data of the 3D map may include the binary data of the plurality of 3D map descriptors. Manner 2: Compressed data of the 3D map is obtained from a memory, and the compressed data of the 3D map is decompressed to obtain the binary data of the plurality of 3D map descriptors. The decompression herein includes but is not limited to prediction and the like. Manner 3: A bitstream of the 3D map is received by using a transmission module (for example, a transceiver), and the bitstream of the 3D map is decompressed to obtain the binary data of the plurality of 3D map descriptors. The decompression herein includes but is not limited to decapsulation, prediction, and the like.

S102: Obtain binary data of a retrieval descriptor, where the retrieval descriptor is a feature that corresponds to a real environment and that is extracted from visual information collected by a sensor of the electronic device.

The retrieval descriptor herein may be the to-be-retrieved area descriptor or the to-be-retrieved 3D map point descriptor in the foregoing embodiment. In other words, the retrieval descriptor may be a to-be-retrieved area descriptor extracted from the visual information, and the to-be-retrieved area descriptor describes features of some or all of the plurality of 3D map points. The to-be-retrieved area descriptor may be a vector, for example, a 128-dimensional vector or a 512-dimensional vector. A quantity of dimensions of the to-be-retrieved area descriptor is not limited to the foregoing example, and may be another value. Examples are not described one by one in this embodiment of this application. Alternatively, the retrieval descriptor may be a to-be-retrieved 3D map point descriptor extracted from the visual information, and the to-be-retrieved 3D map point descriptor is used to indicate a local feature of a corresponding 3D map point. The to-be-retrieved 3D map point descriptor may be a vector, and a quantity of dimensions of the vector may be any positive integer.

Manners of obtaining the retrieval descriptor may include but are not limited to the following manners. In an implementable manner, an execution body of this embodiment may receive the retrieval descriptor sent by another device. For example, this embodiment may be performed by the first electronic device shown in FIG. 1, and the first electronic device may receive a retrieval descriptor sent by the second electronic device. For another example, this embodiment may be performed by the server shown in FIG. 1, and the server may receive a retrieval descriptor sent by the first electronic device or the second electronic device. In another implementable manner, an execution body of this embodiment may receive the visual information sent by another device, and extract the retrieval descriptor from the visual information. For example, this embodiment may be performed by the first electronic device shown in FIG. 1, the first electronic device may receive visual information sent by the second electronic device, and the first electronic device extracts a retrieval descriptor from the visual information. For another example, this embodiment may be performed by the server shown in FIG. 1, the server may receive visual information sent by the first electronic device or the second electronic device, and the server extracts a retrieval descriptor from the visual information. In still another implementable manner, an execution body of this embodiment may detect a visual information collection operation entered by a user, and in response to the operation, trigger a sensor of the execution body to perform visual information collection on the real environment to obtain the visual information, and extract the retrieval descriptor from the visual information. For example, this embodiment may be performed by the first electronic device shown in FIG. 1, and when detecting a visual information collection operation entered by the user, the first electronic device triggers, in response to the operation, a sensor of the first electronic device to perform visual information collection on the real environment to obtain visual information, and extracts a retrieval descriptor from the visual information. The visual information collection operation may be: enabling, in a manner such as tap, touch, slide, or shake, the sensor to collect visual information, or enabling, through sound control or in another manner, the sensor to collect visual information. This is not limited in embodiments of this application. For example, after the first electronic device detects a touch operation performed by the user on a shooting button in the user interface, a camera of the first electronic device is started in response to the touch operation.

S103: Perform retrieval in the binary data of the plurality of 3D map descriptors based on the binary data of the retrieval descriptor, to obtain at least one target 3D map descriptor, where a length of binary data of each of the plurality of 3D map descriptors is different from a length of the binary data of the retrieval descriptor.

The binary data of the retrieval descriptor is compressed data obtained after binarization is performed on an original retrieval descriptor. Bit overheads of the binary data of the retrieval descriptor are obviously less than bit overheads of the original retrieval descriptor. For the explanations and descriptions of the binarization, refer to the specific explanations and descriptions of S101. Details are not described herein again. In this embodiment of this application, the length of the binary data of each of the plurality of 3D map descriptors is different from the length of the binary data of the retrieval descriptor. That is, during the retrieval, the binary data of the 3D map descriptor is asymmetric with the binary data of the retrieval descriptor. Asymmetric retrieval is performed in the binary data of the plurality of 3D map descriptors by using the binary data of the retrieval descriptor, so that a descriptor with a smaller binary data length (the 3D map descriptor or the retrieval descriptor) may have a higher compression ratio, thereby saving storage space and/or transmission resource overheads, and a descriptor with a larger binary data length (the retrieval descriptor or the 3D map descriptor) may provide more information for retrieval, thereby improving retrieval accuracy.

In an implementable manner, a length of binary data of one 3D map descriptor is greater than a length of binary data of a retrieval descriptor. The binary data of the 3D map descriptor has more bits than the binary data of the retrieval descriptor. In this way, more original information of the 3D map descriptor may be retained, thereby improving accuracy of at least one target 3D map descriptor obtained through retrieval. The binary data of the retrieval descriptor has fewer bits. In this way, bit overheads of the retrieval descriptor may be reduced, so that the retrieval descriptor may have a higher compression ratio, thereby saving storage space and/or transmission resource overheads.

In another implementable manner, a length of binary data of one 3D map descriptor is less than a length of binary data of a retrieval descriptor. The binary data of the 3D map descriptor has fewer bits than the binary data of the retrieval descriptor. In this way, storage space and/or transmission resource overheads of the 3D map may be saved. The binary data of the retrieval descriptor has more bits. In this way, more original information of the retrieval descriptor may be retained, thereby improving accuracy of at least one target 3D map descriptor obtained through retrieval.

Optionally, a 3D map point corresponding to the at least one target 3D map descriptor obtained through retrieval matches a map point corresponding to the retrieval descriptor, and in this case, positioning may be further performed based on the 3D map point corresponding to the at least one target 3D map descriptor, to obtain pose information of the electronic device.

In this embodiment, retrieval is performed in the binary data of the plurality of 3D map descriptors based on the binary data of the retrieval descriptor, to obtain the at least one target 3D map descriptor, where the length of the binary data of each of the plurality of 3D map descriptors is different from the length of the binary data of the retrieval descriptor. A length of binary data of a retrieval descriptor used for retrieval is different from a length of binary data of a 3D map descriptor, so that a descriptor with a smaller length (the 3D map descriptor or the retrieval descriptor) may have a higher compression ratio, thereby saving storage space and/or transmission resource overheads, or a descriptor with a larger length (the retrieval descriptor or the 3D map descriptor) may provide more information for retrieval, thereby improving retrieval accuracy.

For example, the length of the binary data of the 3D map descriptor is less than the length of the binary data of the retrieval descriptor. When compared with symmetric retrieval, a compression ratio of the 3D map in this embodiment of this application is higher in the case of same retrieval accuracy, and retrieval accuracy in this embodiment of this application is higher in the case of a same compression ratio.

The binary data may be divided into one or more binary substrings. It should be noted that when the binary data includes one binary substring, the binary substring is the binary data itself.

There are a plurality of exemplary implementations of asymmetric retrieval in this embodiment of this application. In an implementable manner, a plurality of second distances between binary substrings are calculated, a first distance between asymmetric binary data is calculated based on the plurality of second distances, and retrieval is performed based on the first distance. The plurality of second distances between binary substrings may include at least one second distance between symmetric binary substrings and at least one second distance between asymmetric binary substrings. The at least one second distance between asymmetric binary substrings may be obtained in a manner such as looking up a table, or may be obtained by further converting the second distance between asymmetric binary substrings into a second distance between symmetric binary substrings and performing calculation based on the converted second distance between symmetric substrings. In another implementable manner, a plurality of second distances between symmetric binary substrings are calculated, a first distance between asymmetric binary data is calculated based on the plurality of second distances, and retrieval is performed based on the first distance.

Specifically, a first distance between each of the plurality of 3D map descriptors and the retrieval descriptor may be determined based on the binary data of the retrieval descriptor and the binary data of the plurality of 3D map descriptors. At least one 3D map descriptor is selected from the plurality of 3D map descriptors as the at least one target 3D map descriptor based on the first distance between each of the plurality of 3D map descriptors and the retrieval descriptor. For example, one or more 3D map descriptors with relatively small first distances are selected from the plurality of 3D map descriptors as the at least one target 3D map descriptor.

One of the plurality of 3D map descriptors is used as an example to explain and describe the first distance in this embodiment of this application. A distortion of the first distance between the 3D map descriptor and the retrieval descriptor in this embodiment of this application is less than or equal to a distortion threshold. The distortion of the first distance indicated a degree of a difference between the first distance and a corresponding original distance, and the original distance is a distance between the 3D map descriptor and the retrieval descriptor. For example, the original distance may be a Euclidean distance between the 3D map descriptor and the retrieval descriptor. The distortion threshold may be a distortion of a third distance between the 3D map descriptor and the retrieval descriptor. The third distance is a distance between partial data of the binary data of the retrieval descriptor and all data of the binary data of the 3D map descriptor, or is a distance between all data of the binary data of the retrieval descriptor and partial data of the binary data of the 3D map descriptor. For example, when the length of the binary data of the retrieval descriptor is greater than the length of the binary data of the 3D map descriptor, the third distance is a distance between partial data of the binary data of the retrieval descriptor and all data of the binary data of the 3D map descriptor. When the length of the binary data of the retrieval descriptor is less than the length of the binary data of the 3D map descriptor, the third distance is a distance between all data of the binary data of the retrieval descriptor and partial data of the binary data of the 3D map descriptor. The third distance is also a distance between symmetric binary data.

When the length of the binary data of the 3D map descriptor is less than the length of the binary data of the retrieval descriptor, the binary data of the retrieval descriptor may include a plurality of first binary substrings of the retrieval descriptor, and the binary data of the 3D map descriptor may include one or more second binary substrings of the 3D map descriptor. A length of the first binary substring is the same as a length of the second binary substring. The first distance between the binary data of the 3D map descriptor and the binary data of the retrieval descriptor may be determined based on a plurality of second distances. The plurality of second distances may include a distance between each of the plurality of first binary substrings of the retrieval descriptor and the at least one second binary substring of the 3D map descriptor. For example, the binary data of the retrieval descriptor includes two first binary substrings, and the binary data of the 3D map descriptor may include one second binary substring. The first distance between the binary data of the 3D map descriptor and the binary data of the retrieval descriptor may be determined based on two second distances, and the two second distances include a distance between each of the two first binary substrings and the second binary substring.

When the length of the binary data of the 3D map descriptor is less than the length of the binary data of the retrieval descriptor, the binary data of the retrieval descriptor is divided into a plurality of first binary substrings. There may be an overlap or may be no overlap between two adjacent first binary substrings in the plurality of first binary substrings. One first binary substring may be one or more bits. The binary data of the 3D map descriptor may include one or more second binary substrings of the 3D map descriptor. One second binary substring may be one or more bits. There may be an overlap or may be no overlap between two adjacent second binary substrings in the plurality of second binary substrings.

Figure 6:
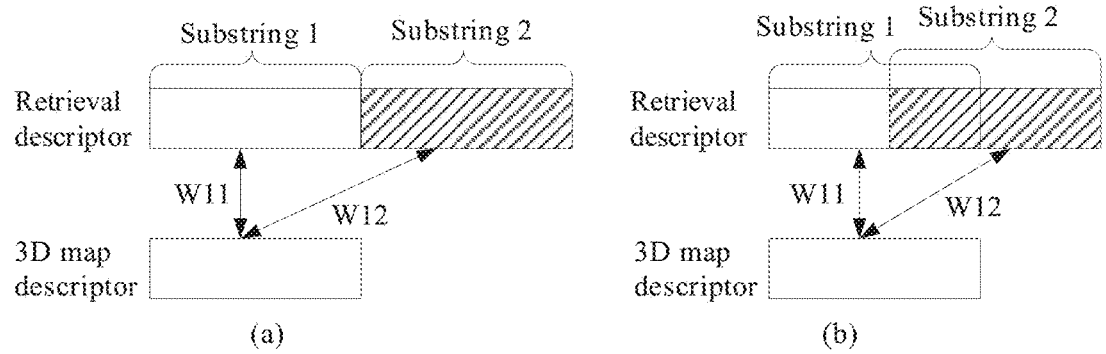
FIG. 6 is a schematic diagram of a 3D map descriptor and a retrieval descriptor according to an embodiment of this application.

Refer to (a) and (b) in FIG. 6. Binary data of a retrieval descriptor includes two first binary substrings (substring 1 and substring 2), and binary data of a 3D map descriptor includes one second binary substring (which is the binary data of the 3D map descriptor itself). As shown in (a) in FIG. 6, there is no overlap between substring 1 and substring 2 of the retrieval descriptor. A length of substring 1 of the retrieval descriptor is the same as a length of the binary data of the 3D map descriptor. A length of substring 2 of the retrieval descriptor is the same as a length of the binary data of the 3D map descriptor. As shown in (b) in FIG. 6, there is an overlap between substring 1 and substring 2 of the retrieval descriptor. A length of substring 1 of the retrieval descriptor is the same as a length of the binary data of the 3D map descriptor. A length of substring 2 of the retrieval descriptor is the same as a length of the binary data of the 3D map descriptor. A first distance between the binary data of the retrieval descriptor and the binary data of the 3D map descriptor shown in (a) and (b) in FIG. 6 may be calculated in the following manner: Based on substring 1 of the retrieval descriptor and the binary data of the 3D map descriptor, a second distance between them may be calculated. Based on substring 2 of the retrieval descriptor and the binary data of the 3D map descriptor, a second distance between them may be calculated. The first distance between the binary data of the retrieval descriptor and the binary data of the 3D map descriptor is calculated based on the second distance between substring 1 of the retrieval descriptor and the binary data of the 3D map descriptor and the second distance between substring 2 of the retrieval descriptor and the binary data of the 3D map descriptor. In order to reduce a distortion of the first distance, different weighting coefficients may be used for different second distances to reflect different importance degrees. W11 and W12 are shown in (a) and (b) in FIG. 6. W11 represents an importance degree corresponding to the second distance between substring 1 of the retrieval descriptor and the binary data of the 3D map descriptor, and W12 represents an importance degree corresponding to the second distance between substring 2 of the retrieval descriptor and the binary data of the 3D map descriptor. In some embodiments, W11 may be greater than W12. W11 and W12 may be determined based on a location of substring 1 of the retrieval descriptor and a location of substring 2 of the retrieval descriptor. For example, if a start location of substring 1 of the retrieval descriptor is before a start location of substring 2 of the retrieval descriptor, W11 may be greater than W12. For another example, if an end location of substring 1 of the retrieval descriptor is before an end location of substring 2 of the retrieval descriptor, W11 may be greater than W12.

It should be noted that the binary data of the retrieval descriptor shown in (a) and (b) in FIG. 6 may further include more binary substrings (for example, substring 3), and the binary data of the 3D map descriptor may further include more binary substrings. The substring of the retrieval descriptor and the substring of the 3D map descriptor in this embodiment of this application are not limited by the example in FIG. 6.

Figure 7:
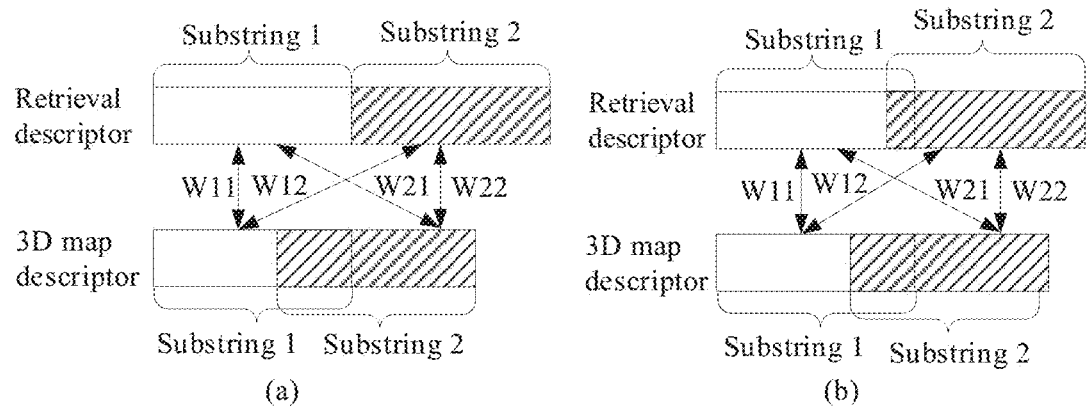
FIG. 7 is a schematic diagram of a 3D map descriptor and a retrieval descriptor according to an embodiment of this application.

Refer to (a) and (b) in FIG. 7. Binary data of a retrieval descriptor includes two first binary substrings (substring 1 and substring 2), and binary data of a 3D map descriptor includes two second binary substrings (substring 1 and substring 2). As shown in (a) in FIG. 7, there is no overlap between substring 1 and substring 2 of the retrieval descriptor. A length of substring 1 of the retrieval descriptor is the same as a length of substring 1 of the 3D map descriptor. A length of substring 2 of the retrieval descriptor is the same as the length of substring 1 of the 3D map descriptor. The length of substring 1 of the retrieval descriptor is the same as a length of substring 2 of the 3D map descriptor. The length of substring 2 of the retrieval descriptor is the same as the length of substring 2 of the 3D map descriptor. As shown in (b) in FIG. 7, there is an overlap between substring 1 and substring 2 of the retrieval descriptor. A length of substring 1 of the retrieval descriptor is the same as a length of substring 1 of the 3D map descriptor. A length of substring 2 of the retrieval descriptor is the same as the length of substring 1 of the 3D map descriptor. The length of substring 1 of the retrieval descriptor is the same as a length of substring 2 of the 3D map descriptor. The length of substring 2 of the retrieval descriptor is the same as the length of substring 2 of the 3D map descriptor. A first distance between the binary data of the retrieval descriptor and the binary data of the 3D map descriptor shown in (a) and (b) in FIG. 7 may be calculated in the following manner: Based on substring 1 of the retrieval descriptor and substring 1 of the 3D map descriptor, a second distance between them may be calculated. Based on substring 2 of the retrieval descriptor and substring 1 of the 3D map descriptor, a second distance between them may be calculated, and based on substring 1 of the retrieval descriptor and substring 2 of the 3D map descriptor, a second distance between them may be calculated. Based on substring 2 of the retrieval descriptor and substring 2 of the 3D map descriptor, a second distance between them may be calculated. The first distance between the binary data of the retrieval descriptor and the binary data of the 3D map descriptor is calculated based on the second distance between substring 1 of the retrieval descriptor and substring 1 of the 3D map descriptor, the second distance between substring 2 of the retrieval descriptor and substring 1 of the 3D map descriptor, the second distance between substring 1 of the retrieval descriptor and substring 2 of the 3D map descriptor, and the second distance between substring 2 of the retrieval descriptor and substring 2 of the 3D map descriptor. In order to reduce a distortion of the first distance, different importance degrees may be used for weighting different second distances. W11, W12, W13, and W14 are shown in (a) and (b) in FIG. 7. W11 represents an importance degree corresponding to the second distance between substring 1 of the retrieval descriptor and substring 1 of the 3D map descriptor, and W12 represents an importance degree corresponding to the second distance between substring 2 of the retrieval descriptor and substring 1 of the 3D map descriptor, W21 represents an importance degree corresponding to the second distance between substring 1 of the retrieval descriptor and substring 2 of the 3D map descriptor, and W22 represents an importance degree corresponding to the second distance between substring 2 of the retrieval descriptor and substring 2 of the 3D map descriptor. In some embodiments, W11 may be greater than W12, and W21 may be greater than W22. W11 and W12 may be determined based on a location of substring 1 of the 3D map descriptor, a location of substring 1 of the retrieval descriptor, and a location of substring 2 of the retrieval descriptor. W21 and W22 may be determined based on a location of substring 2 of the 3D map descriptor, the location of substring 1 of the retrieval descriptor, and the location of substring 2 of the retrieval descriptor.

It should be noted that the binary data of the retrieval descriptor shown in (a) and (b) in FIG. 7 may further include more binary substrings (for example, substring 3), and the binary data of the 3D map descriptor may further include more binary substrings (for example, substring 3). The substring of the retrieval descriptor and the substring of the 3D map descriptor in this embodiment of this application are not limited by the example in FIG. 7.

When the length of the binary data of the 3D map descriptor is greater than the length of the binary data of the retrieval descriptor, the binary data of the retrieval descriptor may include one or more first binary substrings of the retrieval descriptor, and the binary data of the 3D map descriptor may include a plurality of second binary substrings of the 3D map descriptor. A length of the first binary substring is the same as a length of the second binary substring. The first distance between the binary data of the 3D map descriptor and the binary data of the retrieval descriptor may be determined based on a plurality of second distances. The plurality of second distances may include a distance between each of the plurality of second binary substrings of the 3D map descriptor and the one or more first binary substrings of the retrieval descriptor. For example, the binary data of the retrieval descriptor includes one first binary substring, and the binary data of the 3D map descriptor may include two second binary substrings. The first distance between the binary data of the 3D map descriptor and the binary data of the retrieval descriptor may be determined based on two second distances, and the two second distances include a distance between each of the two second binary substrings and the first binary substring.

When the length of the binary data of the 3D map descriptor is greater than the length of the binary data of the retrieval descriptor, the binary data of the retrieval descriptor is divided into one or more first binary substrings. One first binary substring may be one or more bits. The binary data of the 3D map descriptor may include a plurality of second binary substrings of the 3D map descriptor. There may be an overlap or may be no overlap between two adjacent second binary substrings in the plurality of second binary substrings. One second binary substring may be one or more bits. Division manners of the first binary substring and the second binary substring may be similar to those of the embodiments shown in FIG. 6 and FIG. 7. The retrieval descriptor and the 3D map descriptor shown in FIG. 6 and FIG. 7 may be interchanged. For details, refer to FIG. 8 and FIG. 9. To be specific, a length of binary data of a 3D map descriptor is greater than that of binary data of a retrieval descriptor, and exemplary implementations thereof are also applicable.

Figure 8:
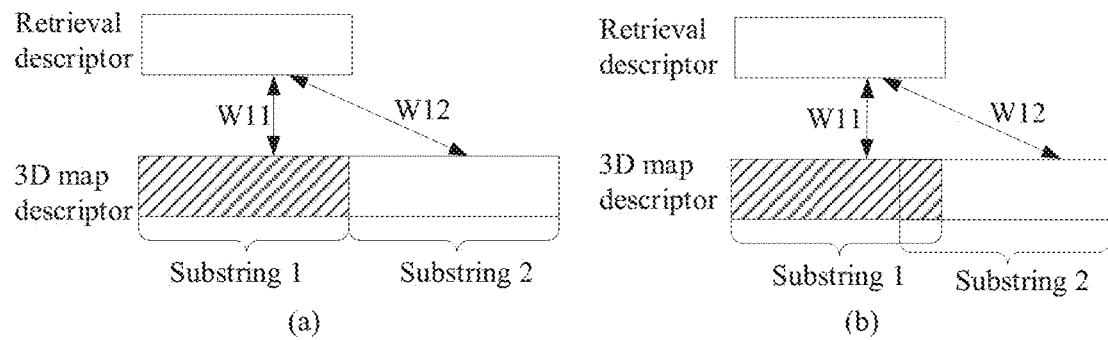
FIG. 8 is a schematic diagram of a 3D map descriptor and a retrieval descriptor according to an embodiment of this application.

Refer to (a) and (b) in FIG. 8. Binary data of a 3D map descriptor includes two first binary substrings (substring 1 and substring 2), and binary data of a retrieval descriptor includes one second binary substring (which is the binary data of the retrieval descriptor itself). As shown in (a) in FIG. 8, there is no overlap between substring 1 and substring 2 of the 3D map descriptor. A length of substring 1 of the 3D map descriptor is the same as a length of the binary data of the retrieval descriptor. A length of substring 2 of the 3D map descriptor is the same as the length of the binary data of the retrieval descriptor. As shown in (b) in FIG. 8, there is an overlap between substring 1 and substring 2 of the 3D map descriptor. A length of substring 1 of the 3D map descriptor is the same as a length of the binary data of the retrieval descriptor. A length of substring 2 of the 3D map descriptor is the same as the length of the binary data of the retrieval descriptor. A first distance between the binary data of the 3D map descriptor and the binary data of the retrieval descriptor shown in (a) and (b) in FIG. 8 may be calculated in the following manner: Based on substring 1 of the 3D map descriptor and the binary data of the retrieval descriptor, a second distance between them may be calculated. Based on substring 2 of the 3D map descriptor and the binary data of the retrieval descriptor, a second distance between them may be calculated. The first distance between the binary data of the retrieval descriptor and the binary data of the 3D map descriptor is calculated based on the second distance between substring 1 of the 3D map descriptor and the binary data of the retrieval descriptor and the second distance between substring 2 of the 3D map descriptor and the binary data of the retrieval descriptor. In order to reduce a distortion of the first distance, different importance degrees may be used for weighting different second distances. W11 and W12 are shown in (a) and (b) in FIG. 8. W11 represents an importance degree corresponding to the second distance between substring 1 of the 3D map descriptor and the binary data of the retrieval descriptor, and arrows of W11 indicate an example of an importance degree corresponding to the second distance between substring 1 of the 3D map descriptor and all binary data of the retrieval descriptor, and W12 represents an importance degree corresponding to the second distance between substring 2 of the 3D map descriptor and the binary data of the retrieval descriptor. In some embodiments, W11 may be greater than W12. W11 and W12 may be determined based on a location of substring 1 of the 3D map descriptor and a location of substring 2 of the 3D map descriptor. For example, if a start location of substring 1 of the 3D map descriptor is before a start location of substring 2 of the 3D map descriptor, W11 may be greater than W12. For another example, if an end location of substring 1 of the 3D map descriptor is before an end location of substring 2 of the 3D map descriptor, W11 may be greater than W12.

It should be noted that the binary data of the 3D map descriptor shown in (a) and (b) in FIG. 8 may further include more binary substrings (for example, substring 3), and the binary data of the retrieval descriptor may further include more binary substrings. The substring of the 3D map descriptor and the substring of the retrieval descriptor in this embodiment of this application are not limited by the example in FIG. 8.

Figure 9:
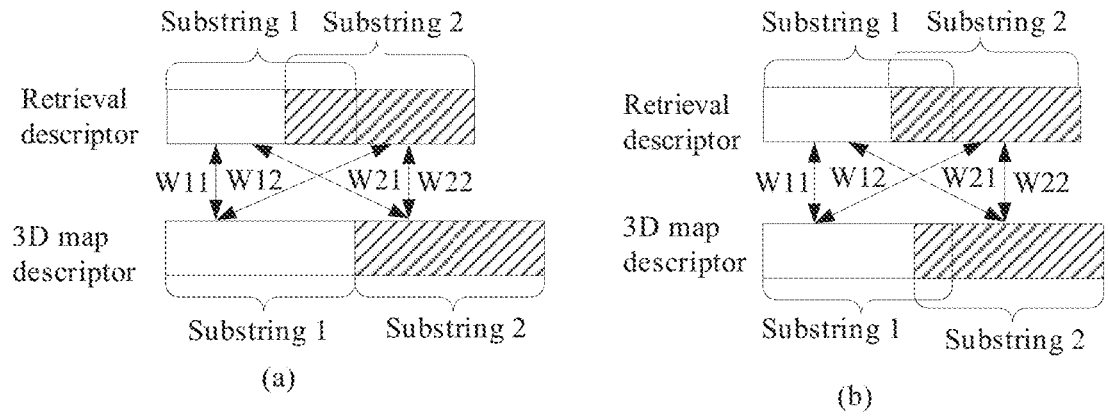
FIG. 9 is a schematic diagram of a 3D map descriptor and a retrieval descriptor according to an embodiment of this application.

Refer to (a) and (b) in FIG. 9. Binary data of a 3D map descriptor includes two first binary substrings (substring 1 and substring 2), and binary data of a retrieval descriptor includes two second binary substrings (substring 1 and substring 2). As shown in (a) in FIG. 9, there is no overlap between substring 1 and substring 2 of the 3D map descriptor. A length of substring 1 of the 3D map descriptor is the same as a length of substring 1 of the retrieval descriptor. A length of substring 2 of the 3D map descriptor is the same as the length of substring 1 of the retrieval descriptor. The length of substring 1 of the 3D map descriptor is the same as a length of substring 2 of the retrieval descriptor. The length of substring 2 of the 3D map descriptor is the same as the length of substring 2 of the retrieval descriptor. As shown in (b) in FIG. 9, there is an overlap between substring 1 and substring 2 of the 3D map descriptor. A length of substring 1 of the 3D map descriptor is the same as a length of substring 1 of the retrieval descriptor. A length of substring 2 of the 3D map descriptor is the same as the length of substring 1 of the retrieval descriptor. The length of substring 1 of the 3D map descriptor is the same as a length of substring 2 of the retrieval descriptor. The length of substring 2 of the 3D map descriptor is the same as the length of substring 2 of the retrieval descriptor. A first distance between the binary data of the 3D map descriptor and the binary data of the retrieval descriptor shown in (a) and (b) in FIG. 9 may be calculated in the following manner: Based on substring 1 of the 3D map descriptor and substring 1 of the retrieval descriptor, a second distance between them may be calculated. Based on substring 2 of the 3D map descriptor and substring 1 of the retrieval descriptor, a second distance between them may be calculated, and based on substring 1 of the 3D map descriptor and substring 2 of the retrieval descriptor, a second distance between them may be calculated. Based on substring 2 of the 3D map descriptor and substring 2 of the retrieval descriptor, a second distance between them may be calculated. The first distance between the binary data of the 3D map descriptor and the binary data of the retrieval descriptor is calculated based on the second distance between substring 1 of the 3D map descriptor and substring 1 of the retrieval descriptor, the second distance between substring 2 of the 3D map descriptor and substring 1 of the retrieval descriptor, the second distance between substring 1 of the 3D map descriptor and substring 2 of the retrieval descriptor, and the second distance between substring 2 of the 3D map descriptor and substring 2 of the retrieval descriptor. In order to reduce a distortion of the first distance, different importance degrees may be used for weighting different second distances. W$1i$, W12, W13, and W14 are shown in (a) and (b) in FIG. 9. W11 represents an importance degree corresponding to the second distance between substring 1 of the 3D map descriptor and substring 1 of the retrieval descriptor, and W12 represents an importance degree corresponding to the second distance between substring 2 of the 3D map descriptor and substring 1 of the retrieval descriptor, W21 represents an importance degree corresponding to the second distance between substring 1 of the 3D map descriptor and substring 2 of the retrieval descriptor, and W22 represents an importance degree corresponding to the second distance between substring 2 of the 3D map descriptor and substring 2 of the retrieval descriptor. In some embodiments, W11 may be greater than W12, and W21 may be greater than W22. W11 and W12 may be determined based on a location of substring 1 of the retrieval descriptor, a location of substring 1 of the 3D map descriptor, and a location of substring 2 of the 3D map descriptor. W21 and W22 may be determined based on a location of substring 2 of the retrieval descriptor, the location of substring 1 of the 3D map descriptor, and the location of substring 2 of the 3D map descriptor.

It should be noted that the binary data of the 3D map descriptor shown in (a) and (b) in FIG. 9 may further include more binary substrings (for example, substring 3), and the binary data of the retrieval descriptor may further include more binary substrings (for example, substring 3). The substring of the 3D map descriptor and the substring of the retrieval descriptor in this embodiment of this application are not limited by the example in FIG. 9.

A first distance between binary data of the 3D map descriptor and the binary data of the retrieval descriptor that are asymmetric is obtained based on a plurality of second distances between symmetric binary substrings of the 3D map descriptor and binary substrings of the retrieval descriptor, and retrieval is performed based on the first distance between the binary data of the 3D map descriptor and the binary data of the retrieval descriptor, so that a descriptor (the 3D map descriptor or the retrieval descriptor) has a higher compression ratio, while ensuring retrieval accuracy.

The following uses an exemplary embodiment as an example to describe asymmetric retrieval based on a plurality of second distances in this embodiment of this application.

Figure 10:
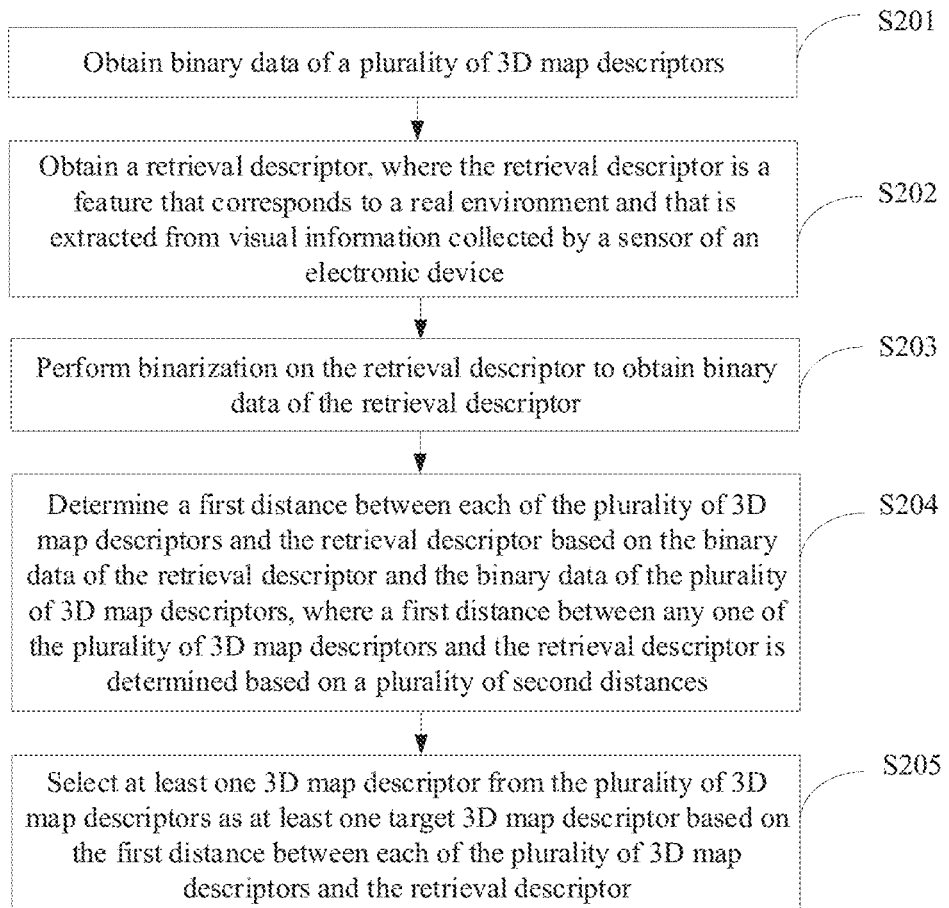
FIG. 10 is a schematic flowchart of a method for retrieving a 3D map according to an embodiment of this application.

Refer to FIG. 10. FIG. 10 is a schematic flowchart of a method for retrieving a 3D map according to an embodiment of this application. In some implementations, the method may be applied to the electronic device (for example, the first electronic device or the second electronic device) in any one of examples of FIG. 1 to FIG. 4f, or may be applied to the server in any one of examples of FIG. 1 to FIG. 4f. An execution body for performing the method for retrieving a 3D map in embodiments of this application may also be referred to as a decompressor end or a decoder end. In this embodiment of this application, an example in which a length of binary data of a 3D map descriptor is less than a length of binary data of a retrieval descriptor is used for description. The method includes but is not limited to the following steps.

S201: Obtain binary data of a plurality of 3D map descriptors.

S202: Obtain binary data of a retrieval descriptor, where the retrieval descriptor is a feature that corresponds to a real environment and that is extracted from visual information collected by a sensor of an electronic device.

For explanations and descriptions of S201 and S202, refer to the explanations and descriptions of S101 and S102 in the embodiment shown in FIG. 5. Details are not described herein again.

S203: Perform binarization on the retrieval descriptor to obtain binary data of the retrieval descriptor.

In this embodiment of this application, the binary data of the retrieval descriptor may be obtained in a plurality of manners. For example, the binary data of the retrieval descriptor may be obtained in a hashing manner such as locality-sensitive hashing or spectral hashing. For example, a magnitude relationship between each component of the retrieval descriptor and a corresponding component of the at least one first preset threshold vector may be determined based on each component of the retrieval descriptor and the corresponding component of the at least one first preset threshold vector. Binarization is performed on the magnitude relationship to obtain the binary data of the retrieval descriptor. Each component included in any one of the at least one first preset threshold vector is any value. A component of the retrieval descriptor is a value of one dimension of the vector of the retrieval descriptor. For example, the retrieval area descriptor may be a vector, for example, an M-dimensional vector, where each dimension of the M dimensions is a component of the vector.

For example, the retrieval descriptor is Q (an M-dimension vector), and a difference value between each component of the retrieval descriptor and a corresponding component of N first preset threshold vectors may be calculated by using the following formula (1):

$$Q'_i = Q - FQ_i, \text{ where } i=1,2,\ldots,N \tag{1}$$

$FQ_i$ is a first preset threshold vector i, and a quantity of dimensions of $FQ_i$ is M. $Q'_i$ is a difference value vector between Q and $FQ_i$. N is a positive integer greater than or equal to 2.

Binarization is performed on $Q'_1, Q'_2, \ldots, Q'_N$ to obtain binary data (HQ) of the retrieval descriptor. In an example, binarization may be performed on $Q'_i$ to obtain a binary vector $Q'_i$ bin. For example, a positive value may be denoted as 1, and a negative value or 0 may be denoted as 0; or a positive value may be denoted as 0, and a negative value or 0 may be denoted as 1. $Q_{total} = \Sigma_{i=1}^{N} Q'_{i\_bin}$ is calculated, and decimal-to-binary conversion is performed on $Q_{total}$ to obtain the binary data of the retrieval descriptor.

S204: Determine a first distance between each of the plurality of 3D map descriptors and the retrieval descriptor based on the binary data of the retrieval descriptor and the binary data of the plurality of 3D map descriptors, where the first distance is determined based on a plurality of second distances.

It should be understood that the first distance herein represents "a distance between each of the plurality of 3D map descriptors and the retrieval descriptor (for example, a distance obtained based on a plurality of Hamming distances)". The concept of "first distance" is used for ease of description.

The binary data of the retrieval descriptor is used to perform retrieval, based on measurement of a new distance (the first distance in this embodiment of this application), in the plurality of 3D map descriptors obtained in S201. Specifically, a first distance between one 3D map descriptor and a retrieval descriptor is used as an example. In this embodiment, because a length of binary data of the 3D map descriptor is less than a length of binary data of the retrieval descriptor, a substring division manner in this embodiment is: dividing the binary data of the retrieval descriptor into a plurality of first binary substrings, where a length of each first binary substring is equal to the length of the binary data of the 3D map descriptor. A second distance between each first binary substring and the binary data of the 3D map descriptor is calculated. A first distance between the 3D map descriptor and the retrieval descriptor is obtained based on the second distance between each of the plurality of first binary substrings and the binary data of the 3D map descriptor. For example, the second distance between each of the plurality of first binary substrings and the binary data of the 3D map descriptor may be multiplied by a corresponding importance degree, and then all second distances are summed to obtain the first distance between the 3D map descriptor and the retrieval descriptor. Certainly, it may be understood that another calculation manner may alternatively be used, and examples are not described one by one herein.

S205: Select at least one 3D map descriptor from the plurality of 3D map descriptors as at least one target 3D map descriptor based on the first distance between each of the plurality of 3D map descriptors and the retrieval descriptor.

In an implementable manner, a first distance between each of the at least one target 3D map descriptor and the retrieval descriptor is less than a first distance between another 3D map descriptors and the retrieval descriptor, and the another 3D map descriptor may be a 3D map descriptor other than the at least one target 3D map descriptor in the plurality of 3D map descriptors.

For example, one or more 3D map descriptors with relatively small values of first distances between the plurality of 3D map descriptors and the retrieval descriptor may be selected as the at least one target 3D map descriptor.

In another implementable manner, a first distance between each of the at least one target 3D map descriptor and the retrieval descriptor is less than a distance deviation threshold, and a value of the distance deviation threshold may be flexibly set according to a positioning requirement.

For example, it is determined whether a first distance between one 3D map descriptor in the plurality of 3D map descriptors and a retrieval descriptor is less than the distance deviation threshold. If the first distance is less than the distance deviation threshold, the 3D map descriptor is used as the target 3D map descriptor. If the first distance is not less than the distance deviation threshold, it is determined whether a first distance between another 3D map descriptor in the plurality of 3D map descriptors and the retrieval descriptor is less than the distance deviation threshold, and the process is repeated, until the determining is completed for all 3D map descriptors.

In this embodiment, the first distance between each of the plurality of 3D map descriptors and the retrieval descriptor is determined based on the binary data of the retrieval descriptor and the binary data of the plurality of 3D map descriptors, and retrieval is performed in the binary data of the plurality of 3D map descriptors based on the first distance between each of the plurality of 3D map descriptors and the retrieval descriptor, to obtain the at least one target 3D map descriptor, where a length of binary data of each of the plurality of 3D map descriptors is less than a length of the binary data of the retrieval descriptor. The length of the binary data of the retrieval descriptor used for retrieval is greater than a length of binary data of one 3D map descriptor, so that the 3D map descriptor may have a higher compression ratio, thereby saving storage space of the 3D map and/or transmission resource overheads. More bits of the retrieval descriptor may provide more information for retrieval, thereby improving retrieval accuracy.

The foregoing describes in detail the method for retrieving a 3D map in embodiments of this application with reference to accompanying drawings. The following describes an apparatus for retrieving a 3D map in embodiments of this application with reference to FIG. 11 and FIG. 12. It should be understood that the apparatus for retrieving a 3D map can perform the method for retrieving a 3D map in embodiments of this application. To avoid unnecessary repetition, the following appropriately omits repeated descriptions when describing the apparatus for retrieving a 3D map in embodiments of this application.

Figure 11:
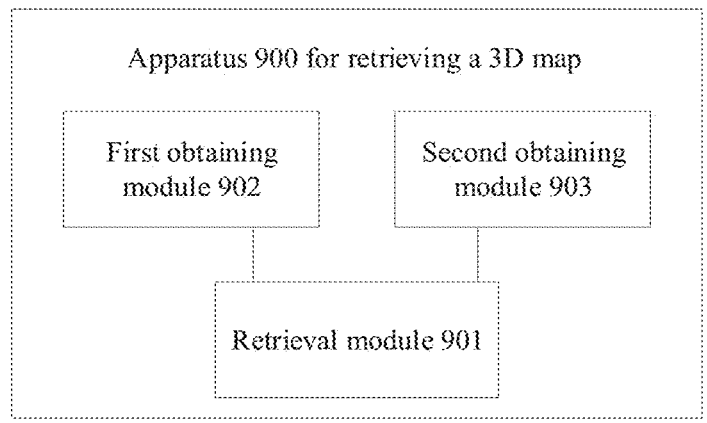
FIG. 11 is a schematic diagram of a structure of an apparatus for retrieving a 3D map according to an embodiment of this application.

Refer to FIG. 11. FIG. 11 is a schematic diagram of a structure of an apparatus for retrieving a 3D map according to an embodiment of this application. As shown in FIG. 11, the apparatus 900 for retrieving a 3D map may include: a retrieval module 901, a first obtaining module 902, and a second obtaining module 903.

The first obtaining module 902 is configured to obtain binary data of a plurality of 3D map descriptors, where the plurality of 3D map descriptors correspond to at least one 3D map point of a 3D map. The second obtaining module 903 is configured to obtain binary data of a retrieval descriptor, where the retrieval descriptor is a feature that corresponds to a real environment and that is extracted from visual information collected by a sensor of an electronic device. The retrieval module 901 is configured to perform retrieval in the binary data of the plurality of 3D map descriptors based on the binary data of the retrieval descriptor, to obtain at least one target 3D map descriptor, where a length of binary data of each of the plurality of 3D map descriptors is different from a length of the binary data of the retrieval descriptor.

In some embodiments, a 3D map point corresponding to the at least one target 3D map descriptor matches a map point corresponding to the retrieval descriptor, and the apparatus may further include a pose determining module. The pose determining module is configured to perform positioning based on the 3D map point corresponding to the at least one target 3D map descriptor, to obtain pose information of the electronic device.

In some embodiments, the retrieval module 901 is configured to: determining a first distance between each of the plurality of 3D map descriptors and the retrieval descriptor based on the binary data of the retrieval descriptor and the binary data of the plurality of 3D map descriptors, where a first distance between any one of the plurality of 3D map descriptors and the retrieval descriptor is determined based on a plurality of second distances; and any one of the plurality of second distances is determined based on partial data of binary data of a corresponding retrieval descriptor and partial data or all data of binary data of the 3D map descriptor, or is determined based on partial data of binary data of a corresponding 3D map descriptor and partial data or all data of the binary data of the retrieval descriptor; and select at least one 3D map descriptor from the plurality of 3D map descriptors as the at least one target 3D map descriptor based on the first distance between each of the plurality of 3D map descriptors and the retrieval descriptor.

In some embodiments, a distortion of a first distance between any one of the plurality of 3D map descriptors and the retrieval descriptor is less than a distortion threshold. The distortion of the first distance indicates a degree of a difference between the first distance and a corresponding original distance, and the original distance is a distance between the 3D map descriptor and the retrieval descriptor.

In some embodiments, a length of partial data of the binary data of the retrieval descriptor is the same as a length of partial data or all data of the binary data of each of the plurality of 3D map descriptors, or a length of partial data of the binary data of each of the plurality of 3D map descriptors is the same as a length of partial data or all data of the binary data of the retrieval descriptor.

In some embodiments, the first distance between any one of the plurality of 3D map descriptors and the retrieval descriptor is determined based on the plurality of second distances and weighting coefficients respectively corresponding to the plurality of second distances.

In some embodiments, when the length of the binary data of each of the plurality of 3D map descriptors is less than the length of the binary data of the retrieval descriptor, the binary data of the retrieval descriptor includes a plurality of first binary substrings of the retrieval descriptor, the binary data of each of the plurality of 3D map descriptors includes at least one second binary substring of each of the plurality of 3D map descriptors, a length of each of the plurality of first binary substrings is the same as a length of each of the at least one second binary substring, and the plurality of second distances include a distance between each of the plurality of first binary substrings and the at least one second binary substring.

When the length of the binary data of each of the plurality of 3D map descriptors is greater than the length of the binary data of the retrieval descriptor, the binary data of the retrieval descriptor includes at least one first binary substring of the retrieval descriptor, the binary data of each of the plurality of 3D map descriptors includes a plurality of second binary substrings of each of the plurality of 3D map descriptors, a length of each of the at least one first binary substring is the same as a length of each of the plurality of second binary substrings, and the plurality of second distances include a distance between each of the plurality of second binary substrings and the at least one first binary substring.

In some embodiments, any one of the plurality of 3D map descriptors includes an area descriptor or a 3D map point descriptor.

In some embodiments, the first obtaining module 902 is configured to obtain compressed data of the 3D map, where the compressed data of the 3D map includes the binary data of the plurality of 3D map descriptors; or the first obtaining module 902 is configured to obtain compressed data of the 3D map, and decompress the compressed data of the 3D map to obtain the binary data of the plurality of 3D map descriptors; or the first obtaining module 902 is configured to receive a bitstream of the 3D map, and decompress the bitstream of the 3D map to obtain the binary data of the plurality of 3D map descriptors.

In some embodiments, the second obtaining module 903 is configured to receive the retrieval descriptor, and perform binarization on the retrieval descriptor to obtain the binary data of the retrieval descriptor; or the second obtaining module 903 is configured to receive the visual information, extract the retrieval descriptor from the visual information, and perform binarization on the retrieval descriptor to obtain the binary data of the retrieval descriptor; or the second obtaining module 903 is configured to: in response to a visual information collection operation entered by the user, trigger the sensor to perform visual information collection on the real environment to obtain the visual information, extract the retrieval descriptor from the visual information, and perform binarization on the retrieval descriptor to obtain the binary data of the retrieval descriptor.

It should be noted that the apparatus 900 for retrieving a 3D map may perform the method for retrieving a 3D map in any one of the embodiments shown in FIG. 5 to FIG. 10. For exemplary implementation principles and technical effects, refer to the specific explanations and descriptions of the foregoing method embodiment. Details are not described herein again.

Figure 12:
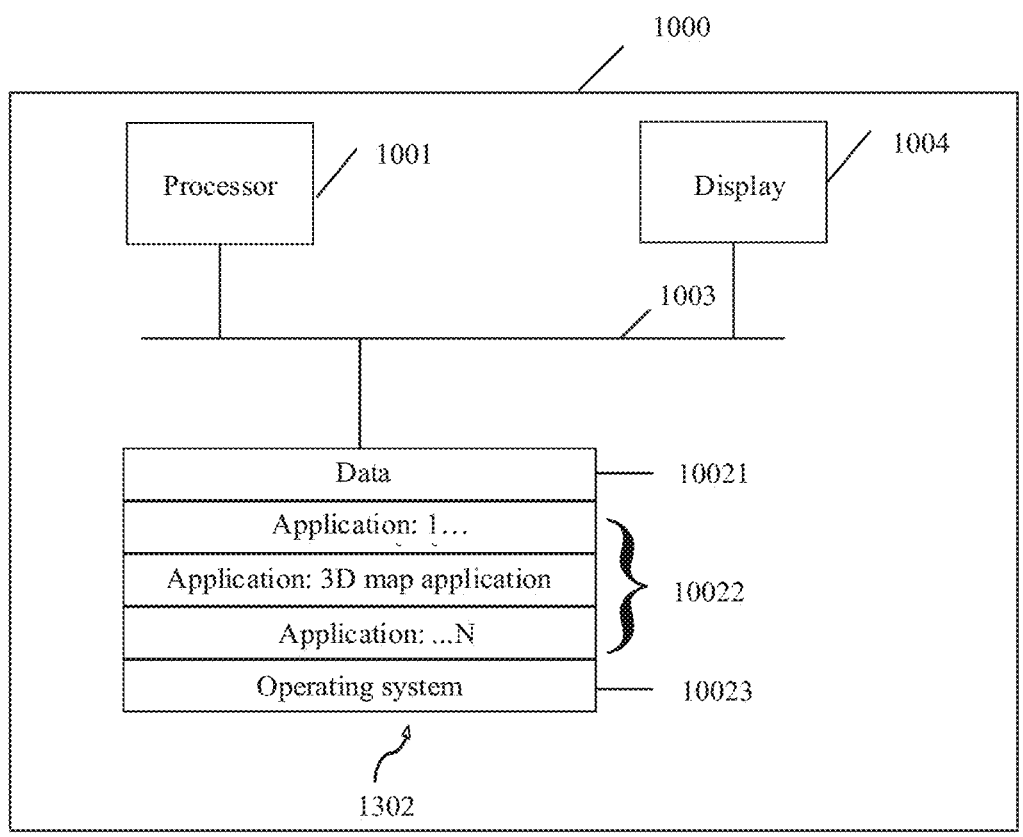
FIG. 12 is a schematic block diagram of a decoding apparatus 1000 according to an embodiment of this application.

FIG. 12 is a schematic block diagram of an implementation of a decoding apparatus 1000 according to an embodiment of this application. The decoding apparatus 1000 may include a processor 1001, a memory 1002, and a bus system 1003. The processor 1001 and the memory 1002 are connected through the bus system 1003. The memory 1002 is configured to store instructions. The processor 1001 is configured to execute the instructions stored in the memory 1002, to perform various methods for retrieving a 3D map described in this application. To avoid repetition, details are not described herein again.

In this embodiment of this application, the processor 1001 may be a central processing unit (CPU), or the processor 1001 may be another general-purpose processor, a DSP, an ASIC, an FPGA or another programmable logic device, a discrete gate or a transistor logic device, a discrete hardware component, or the like. The general-purpose processor may be a microprocessor, or the processor may be any conventional processor or the like.

The memory 1002 may include a ROM device or a RAM device. Any other proper type of storage device may also be used as the memory 1002. The memory 1002 may include code and data 10021 that are accessed by the processor 1001 through the bus 1003. The memory 1002 may further include an operating system 10023 and an application 10022. The application 10022 includes at least one program that allows the processor 1001 to perform the method for retrieving a 3D map described in this application. For example, the application 10022 may include applications 1 to N, and further include a 3D map application that performs the method for retrieving a 3D map described in this application.

The bus system 1003 may further include a power bus, a control bus, a status signal bus, and the like, in addition to a data bus. However, for clarity of description, various types of buses in the figure are denoted as the bus system 1003.

Optionally, the decoding apparatus 1000 may further include one or more output devices, such as a display 1004. In an example, the display 1004 may be a touch display that combines a display and a touch unit that operably senses a touch input. The display 1004 may be connected to the processor 1001 through the bus 1003.

It should be noted that the decoding apparatus 1000 may perform the method for retrieving a 3D map in this application.

A person skilled in the art can understand that the functions described with reference to various illustrative logical blocks, modules, and algorithm steps disclosed and described in this specification can be implemented by hardware, software, firmware, or any combination thereof. If the functions are implemented by software, the functions described with reference to the illustrative logical blocks, modules, and steps may be stored in or transmitted over a computer-readable medium as one or more instructions or code and executed by a hardware-based processing unit. The computer-readable medium may include a computer-readable storage medium corresponding to a tangible medium, such as a data storage medium, or any communication medium that facilitates transmission of a computer program from one place to another (for example, according to a communication protocol). In this manner, the computer-readable medium may generally correspond to (1) a non-transitory tangible computer-readable storage medium, or (2) a communication medium such as a signal or a carrier. The data storage medium may be any usable medium that can be accessed by one or more computers or one or more processors to retrieve instructions, code, and/or data structures for implementing the technologies described in this application. A computer program product may include a computer-readable medium.

In an example but not a limitation, such computer-readable storage media may include a RAM, a ROM, an EEPROM, a CD-ROM or another compact disc storage apparatus, a magnetic disk storage apparatus or another magnetic storage apparatus, a flash memory, or any other medium that can be used to store desired program code in a form of instructions or a data structure and that is accessible by a computer. In addition, any connection is properly referred to as a computer-readable medium. For example, if instructions are transmitted from a website, a server, or another remote source through a coaxial cable, an optical fiber, a twisted pair, a digital subscriber line (DSL), or a wireless technology such as infrared, radio, or microwave, the coaxial cable, the optical fiber, the twisted pair, the DSL, or the wireless technology such as infrared, radio, or microwave is included in a definition of the medium. However, it should be understood that the computer-readable storage medium and the data storage medium do not include connections, carriers, signals, or other transitory media, but actually mean non-transitory tangible storage media. Disks and discs used in this specification include a compact disc (CD), a laser disc, an optical disc, a digital versatile disc (DVD), and a Blu-ray disc. The disks usually reproduce data magnetically, whereas the discs reproduce data optically by using lasers. Combinations of the foregoing items should also be included in the scope of the computer-readable media.

Instructions may be executed by one or more processors such as one or more digital signal processors (DSPs), general microprocessors, application-specific integrated circuits (ASICs), field-programmable gate arrays (FPGAs), or other equivalent integrated or discrete logic circuits. Therefore, the term "processor" used in this specification may refer to the foregoing structure, or any other structure that may be applied to implementation of the technologies described in this specification. In addition, in some aspects, the functions described with reference to the illustrative logical blocks, modules, and steps described in this specification may be provided within dedicated hardware and/or software modules configured for encoding and decoding, or may be incorporated into a combined codec. In addition, the technologies may be completely implemented in one or more circuits or logic elements.

The technologies in this application may be implemented in various apparatuses or devices, including a wireless handset, an integrated circuit (IC), or a set of ICs (for example, a chip set). Various components, modules, or units are described in this application to emphasize functional aspects of apparatuses configured to perform the disclosed techniques, but do not necessarily require realization by different hardware units. Actually, as described above, various units may be combined into a codec hardware unit in combination with appropriate software and/or firmware, or may be provided by interoperable hardware units (including the one or more processors described above).

The foregoing descriptions are merely exemplary implementations of the present disclosure, but the protection scope of this application is not limited thereto. Any variation or replacement readily figured out by a person skilled in the art within the technical scope disclosed in this application shall fall within the protection scope of this application. Therefore, the protection scope of the present disclosure shall be subject to the protection scope of the claims.

What is claimed is:

1. A method for retrieving a three-dimensional (3D) map, applied to an apparatus that comprises at least one processor, wherein the method comprises:
   obtaining and decompressing, by the at least one processor, binary data of a plurality of 3D map descriptors, wherein the plurality of 3D map descriptors correspond to at least one 3D map point of the 3D map;
   obtaining and decompressing, by the at least one processor, binary data of a retrieval descriptor, wherein the retrieval descriptor is a feature that corresponds to a real environment and that is extracted from visual information collected by a sensor of an electronic device; and
   performing, by the at least one processor, retrieval in the binary data of the plurality of 3D map descriptors based on the binary data of the retrieval descriptor, to obtain at least one target 3D map descriptor, wherein a length of binary data of each of the plurality of 3D map descriptors is different from a length of the binary data of the retrieval descriptor,
   wherein performing the retrieval in the binary data of the plurality of 3D map descriptors based on the binary data of the retrieval descriptor, to obtain the at least one target 3D map descriptor comprises:
      determining, by the at least one processor, a first distance between each of the plurality of 3D map descriptors and the retrieval descriptor based on the binary data of the retrieval descriptor and the binary data of the plurality of 3D map descriptors, wherein a first distance between any one of the plurality of 3D map descriptors and the retrieval descriptor is determined based on a plurality of second distances; and any one of the plurality of second distances is determined based on partial data of the binary data of the retrieval descriptor and partial data of the binary data of the 3D map descriptor, or is determined based on partial data of the binary data of the retrieval descriptor and all data of the binary data of the 3D map descriptor, or is determined based on partial data of the binary data of the 3D map descriptor and all data of the binary data of the retrieval descriptor; and
      selecting, by the at least one processor, at least one 3D map descriptor from the plurality of 3D map descriptors as the at least one target 3D map descriptor based on the first distance between each of the plurality of 3D map descriptors and the retrieval descriptor.

2. The method according to claim 1, wherein a 3D map point corresponding to the at least one target 3D map descriptor matches a map point corresponding to the retrieval descriptor, and the method further comprises:
   performing, by the at least one processor, positioning based on the 3D map point corresponding to the at least one target 3D map descriptor, to obtain pose information of the electronic device.

3. The method according to claim 1, wherein the obtaining and decompressing, by the at least one processor, the binary data of the retrieval descriptor comprises:
   receiving, by the at least one processor, the retrieval descriptor, and performing, by the at least one processor, binarization on the retrieval descriptor to obtain the binary data of the retrieval descriptor;
   receiving, by the at least one processor, the visual information, extracting the retrieval descriptor from the visual information, and performing, by the at least one processor, binarization on the retrieval descriptor to obtain the binary data of the retrieval descriptor; or
   in response to a visual information collection operation entered by a user, triggering, by the at least one processor, the sensor to perform visual information collection on the real environment to obtain the visual information, extracting, by the at least one processor, the retrieval descriptor from the visual information, and performing, by the at least one processor, binarization on the retrieval descriptor to obtain the binary data of the retrieval descriptor.

4. The method according to claim 1, wherein a distortion of a first distance between any one of the plurality of 3D map descriptors and the retrieval descriptor is less than a distortion threshold; and
   the distortion of the first distance indicates a degree of a difference between the first distance and a corresponding original distance, and the original distance is a distance between the 3D map descriptor and the retrieval descriptor.

5. The method according to claim 1, wherein a length of partial data of the binary data of the retrieval descriptor is the same as a length of partial data of the binary data of each of the plurality of 3D map descriptors; or a length of partial data of the binary data of the retrieval descriptor is the same as a length of all data of the binary data of each of the plurality of 3D map descriptors; or a length of partial data of the binary data of each of the plurality of 3D map descriptors is the same as a length of all data of the binary data of the retrieval descriptor.

6. The method according to claim 1, wherein the first distance between any one of the plurality of 3D map descriptors and the retrieval descriptor is determined based on the plurality of second distances and weighting coefficients respectively corresponding to the plurality of second distances.

7. The method according to claim 1, wherein, based on the length of the binary data of each of the plurality of 3D map descriptors being less than the length of the binary data of the retrieval descriptor, the binary data of the retrieval descriptor comprises a plurality of first binary substrings of the retrieval descriptor, the binary data of each of the plurality of 3D map descriptors comprises at least one second binary substring of each of the plurality of 3D map descriptors, a length of each of the plurality of first binary substrings is the same as a length of each of the at least one second binary substring, and the plurality of second distances comprise a distance between each of the plurality of first binary substrings and the at least one second binary substring; or based on the length of the binary data of each of the plurality of 3D map descriptors being greater than the length of the binary data of the retrieval descriptor, the binary data of the retrieval descriptor comprises at least one first binary substring of the retrieval descriptor, the binary data of each of the plurality of 3D map descriptors comprises a plurality of second binary substrings of each of the plurality of 3D map descriptors, a length of each of the at least one first binary substring is the same as a length of each of the plurality of second binary substrings, and the plurality of second distances comprise a distance between each of the plurality of second binary substrings and the at least one first binary substring.

8. The method according to claim 1, wherein any one of the plurality of 3D map descriptors comprises an area descriptor or a 3D map point descriptor.

9. The method according to claim 1, wherein the obtaining and decompressing, by the at least one processor, the binary data of the plurality of 3D map descriptors comprises:
obtaining, by the at least one processor, compressed data of the 3D map, wherein the compressed data of the 3D map comprises the binary data of the plurality of 3D map descriptors;
obtaining, by the at least one processor, compressed data of the 3D map, and decompressing, by the at least one processor, the compressed data of the 3D map to obtain the binary data of the plurality of 3D map descriptors; or
receiving, by the at least one processor, a bitstream of the 3D map, and decompressing, by the at least one processor, the bitstream of the 3D map to obtain the binary data of the plurality of 3D map descriptors.

10. A non-transitory computer-readable storage medium storing computer instructions, wherein when the computer instructions are executed on a computer, cause the computer to perform the operations of:

obtaining binary data of a plurality of 3D map descriptors, wherein the plurality of 3D map descriptors correspond to at least one 3D map point of a 3D map;
obtaining binary data of a retrieval descriptor, wherein the retrieval descriptor is a feature that corresponds to a real environment and that is extracted from visual information collected by a sensor of an electronic device; and
performing retrieval in the binary data of the plurality of 3D map descriptors based on the binary data of the retrieval descriptor, to obtain at least one target 3D map descriptor, wherein a length of binary data of each of the plurality of 3D map descriptors is different from a length of the binary data of the retrieval descriptor,
wherein performing the retrieval in the binary data of the plurality of 3D map descriptors based on the binary data of the retrieval descriptor, to obtain the at least one target 3D map descriptor comprises:
determining, by the at least one processor, a first distance between each of the plurality of 3D map descriptors and the retrieval descriptor based on the binary data of the retrieval descriptor and the binary data of the plurality of 3D map descriptors, wherein a first distance between any one of the plurality of 3D map descriptors and the retrieval descriptor is determined based on a plurality of second distances; and any one of the plurality of second distances is determined based on partial data of the binary data of the retrieval descriptor and partial data of the binary data of the 3D map descriptor, or is determined based on partial data of the binary data of the retrieval descriptor and all data of the binary data of the 3D map descriptor, or is determined based on partial data of the binary data of the 3D map descriptor and all data of the binary data of the retrieval descriptor; and
selecting, by the at least one processor, at least one 3D map descriptor from the plurality of 3D map descriptors as the at least one target 3D map descriptor based on the first distance between each of the plurality of 3D map descriptors and the retrieval descriptor.

11. The non-transitory computer-readable storage medium according to claim 10, wherein a distortion of a first distance between any one of the plurality of 3D map descriptors and the retrieval descriptor is less than a distortion threshold; and
the distortion of the first distance indicates a degree of a difference between the first distance and a corresponding original distance, and the original distance is a distance between the 3D map descriptor and the retrieval descriptor.

12. The non-transitory computer-readable storage medium according to claim 10, wherein a length of partial data of the binary data of the retrieval descriptor is the same as a length of partial data of the binary data of each of the plurality of 3D map descriptors; or a length of partial data of the binary data of the retrieval descriptor is the same as a length of all data of the binary data of each of the plurality of 3D map descriptors; or a length of partial data of the binary data of each of the plurality of 3D map descriptors is the same as a length of all data of the binary data of the retrieval descriptor.

13. An apparatus for retrieving a three-dimensional (3D) map, wherein the method comprises:
at least one processor; and one or more memories coupled to the at least one processor and storing programming instructions for execution by the at least one processor to cause the apparatus to:
  obtain and decompress binary data of a plurality of 3D map descriptors, wherein the plurality of 3D map descriptors correspond to at least one 3D map point of the 3D map;
  obtain and decompress binary data of a retrieval descriptor, wherein the retrieval descriptor is a feature that corresponds to a real environment and that is extracted from visual information collected by a sensor of an electronic device; and
  perform retrieval in the binary data of the plurality of 3D map descriptors based on the binary data of the retrieval descriptor, to obtain at least one target 3D map descriptor, wherein a length of binary data of each of the plurality of 3D map descriptors is different from a length of the binary data of the retrieval descriptor,
  wherein performing the retrieval in the binary data of the plurality of 3D map descriptors based on the binary data of the retrieval descriptor, to obtain the at least one target 3D map descriptor comprises:
    determining, by the at least one processor, a first distance between each of the plurality of 3D map descriptors and the retrieval descriptor based on the binary data of the retrieval descriptor and the binary data of the plurality of 3D map descriptors, wherein a first distance between any one of the plurality of 3D map descriptors and the retrieval descriptor is determined based on a plurality of second distances; and any one of the plurality of second distances is determined based on partial data of the binary data of the retrieval descriptor and partial data of the binary data of the 3D map descriptor, or is determined based on partial data of the binary data of the retrieval descriptor and all data of the binary data of the 3D map descriptor, or is determined based on partial data of the binary data of the 3D map descriptor and all data of the binary data of the retrieval descriptor; and
    selecting, by the at least one processor, at least one 3D map descriptor from the plurality of 3D map descriptors as the at least one target 3D map descriptor based on the first distance between each of the plurality of 3D map descriptors and the retrieval descriptor.

14. The apparatus according to claim 13, wherein a distortion of a first distance between any one of the plurality of 3D map descriptors and the retrieval descriptor is less than a distortion threshold; and
  the distortion of the first distance indicates a degree of a difference between the first distance and a corresponding original distance, and the original distance is a distance between the 3D map descriptor and the retrieval descriptor.

15. The apparatus according to claim 13, wherein a length of partial data of the binary data of the retrieval descriptor is the same as a length of partial data of the binary data of each of the plurality of 3D map descriptors; or a length of partial data of the binary data of the retrieval descriptor is the same as a length of all data of the binary data of each of the plurality of 3D map descriptors; or a length of partial data of the binary data of each of the plurality of 3D map descriptors is the same as a length of all data of the binary data of the retrieval descriptor.

16. The apparatus according to claim 13, wherein the first distance between any one of the plurality of 3D map descriptors and the retrieval descriptor is determined based on the plurality of second distances and weighting coefficients respectively corresponding to the plurality of second distances.

17. The apparatus according to claim 13, wherein, based on the length of the binary data of each of the plurality of 3D map descriptors being less than the length of the binary data of the retrieval descriptor, the binary data of the retrieval descriptor comprises a plurality of first binary substrings of the retrieval descriptor, the binary data of each of the plurality of 3D map descriptors comprises at least one second binary substring of each of the plurality of 3D map descriptors, a length of each of the plurality of first binary substrings is the same as a length of each of the at least one second binary substring, and the plurality of second distances comprise a distance between each of the plurality of first binary substrings and the at least one second binary substring; or
  based on the length of the binary data each of the plurality of 3D map descriptors being greater than the length of the binary data of the retrieval descriptor, the binary data of the retrieval descriptor comprises at least one first binary substring of the retrieval descriptor, the binary data of each of the plurality of 3D map descriptors comprises a plurality of second binary substrings of each of the plurality of 3D map descriptors, a length of each of the at least one first binary substring is the same as a length of each of the plurality of second binary substrings, and the plurality of second distances comprise a distance between each of the plurality of second binary substrings and the at least one first binary substring.

18. The apparatus according to claim 13, wherein any one of the plurality of 3D map descriptors comprises an area descriptor or a 3D map point descriptor.

19. The apparatus according to claim 13, wherein the at least one processor further executes the instructions to:
  obtain compressed data of the 3D map, wherein the compressed data of the 3D map comprises the binary data of the plurality of 3D map descriptors;
  obtain compressed data of the 3D map, and decompress the compressed data of the 3D map to obtain the binary data of the plurality of 3D map descriptors; or
  receive a bitstream of the 3D map, and decompress the bitstream of the 3D map to obtain the binary data of the plurality of 3D map descriptors.

20. The apparatus according to claim 13, wherein a 3D map point corresponding to the at least one target 3D map descriptor matches a map point corresponding to the retrieval descriptor, and the at least one processor further executes the instructions to:
  perform positioning based on the 3D map point corresponding to the at least one target 3D map descriptor, to obtain pose information of the electronic device.

* * * * *